US010803447B2

(12) United States Patent
Kim et al.

(10) Patent No.: US 10,803,447 B2
(45) Date of Patent: Oct. 13, 2020

(54) MOBILE TERMINAL AND METHOD FOR CONTROLLING THE SAME

(71) Applicant: LG ELECTRONICS INC., Seoul (KR)

(72) Inventors: Dongmin Kim, Seoul (KR); Soohyun Nam, Seoul (KR); Sanghak Lee, Seoul (KR); Donghan Yoon, Seoul (KR); Seungyup Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1007 days.

(21) Appl. No.: 15/294,117

(22) Filed: Oct. 14, 2016

(65) Prior Publication Data
US 2017/0352023 A1 Dec. 7, 2017

(30) Foreign Application Priority Data
Jun. 2, 2016 (KR) .................... 10-2016-0068946

(51) Int. Cl.
*G06Q 40/00* (2012.01)
*G06Q 20/34* (2012.01)
*H04M 1/00* (2006.01)
*H04B 1/3816* (2015.01)
*G06K 7/08* (2006.01)
*G06K 7/10* (2006.01)
*G06K 19/07* (2006.01)
*G06Q 20/32* (2012.01)
*G06Q 20/40* (2012.01)

(52) U.S. Cl.
CPC ......... *G06Q 20/353* (2013.01); *G06K 7/089* (2013.01); *G06K 7/10326* (2013.01); *G06K 19/0702* (2013.01); *G06K 19/0707* (2013.01); *G06K 19/0715* (2013.01); *G06Q 20/327* (2013.01); *G06Q 20/3227* (2013.01); *G06Q 20/352* (2013.01); *G06Q 20/3567* (2013.01); *G06Q 20/4014* (2013.01); *H04B 1/3816* (2013.01); *H04M 1/00* (2013.01)

(58) Field of Classification Search
CPC ...................................... G06Q 40/00
USPC ........................................... 705/39
See application file for complete search history.

(56) References Cited

U.S. PATENT DOCUMENTS

2010/0012721 A1 1/2010 Jain et al.
2016/0315669 A1* 10/2016 Shi ................. H01Q 1/2225

FOREIGN PATENT DOCUMENTS

CN 103078973 A 5/2013
WO WO 2014/210183 A2 12/2014

* cited by examiner

*Primary Examiner* — Ojo O Oyebisi
(74) *Attorney, Agent, or Firm* — Birch, Stewart, Kolasch & Birch, LLP

(57) ABSTRACT

A mobile terminal including a wireless communication unit configured to provide wireless communication; a display; and a back cover mounted to a rear surface of a body of the mobile terminal. Further, the back cover includes an accommodation unit formed on one surface of the back cover, and configured to accommodate a card inserted into the accommodation unit; a coil configured to convert an electric signal from the card into a magnetic signal to be transmitted to a payment machine; and a data terminal electrically connected to the coil, disposed at a position contacting a corresponding data terminal of the card inserted into the accommodation unit and configured to transfer the electrical signal from the card to the coil.

15 Claims, 21 Drawing Sheets (a)

(b)

(a)

(b)

(c)

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0068946, filed on Jun. 2, 2016, the contents of which are incorporated by reference herein in its entirety.

BACKGROUND OF THE INVENTION

1. Field of the Invention

This specification relates to a mobile terminal which provides a payment service, and a method for controlling the same.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

With the development of a fintech service implemented as finance and technology are combined with each other, a payment service using a mobile terminal has been provided. Such a payment service is being developed from a hardware-based mobile convenient payment service, to an application-based convenient payment service, in various manners. As the hardware-based mobile convenient payment service, there is an all-in-one card service which executes a payment using a card selected by a user, the all-in-one card containing a plurality of card information therein.

The all-in-one card has an advantage that a user can execute payments using a plurality of cards with a single card. Such an all-in-one card may be also referred to as a white card, a smart card or an e-card. However, the all-in-one card has the following disadvantages.

Firstly, the all-in-one card is expensive to manufacture, since all-in-one it is provided with various electronic components. Secondly, since the all-in-one card executes only a contact type payment like the conventional credit cards, a user has to always carry the all-in-one card out whenever he or she wishes to execute a payment.

SUMMARY OF THE INVENTION

Therefore, an aspect of the detailed description is to provide a mobile terminal capable of extending a payment function.

Another aspect of the detailed description is to provide a method to execute a non-contact type payment using a card which can execute a payment in a contact manner.

Another aspect of the detailed description is to provide a method to charge a battery of a card in a convenient manner.

Another aspect of the detailed description is to provide a coupling structure between a mobile terminal and a card.

To achieve these and other advantages and in accordance with the purpose of this specification, as embodied and broadly described herein, there is provided a mobile terminal, including; a body; and a back cover mounted to a rear surface of the body, wherein the back cover includes: an accommodation unit formed on one surface of the back cover, and configured to accommodate a card therein; a coil configured to convert an electric signal into a magnetic signal; and a data terminal electrically connected to the coil, and disposed at a position contacting the card inserted into the accommodation unit.

To achieve these and other advantages and in accordance with the purpose of this specification, as embodied and broadly described herein, there is also provided a method of controlling a mobile terminal, including: sensing an inserted state of a card into an accommodation unit of a back cover of a mobile terminal; communicating the mobile terminal with the card when the card is inserted into the accommodation unit; transmitting a payment command to the card through the communication; receiving card information from the card on the back cover, based on the payment command; and sending the card information to the outside, after converting the card information into magnetic stripe information by a coil of the back cover.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
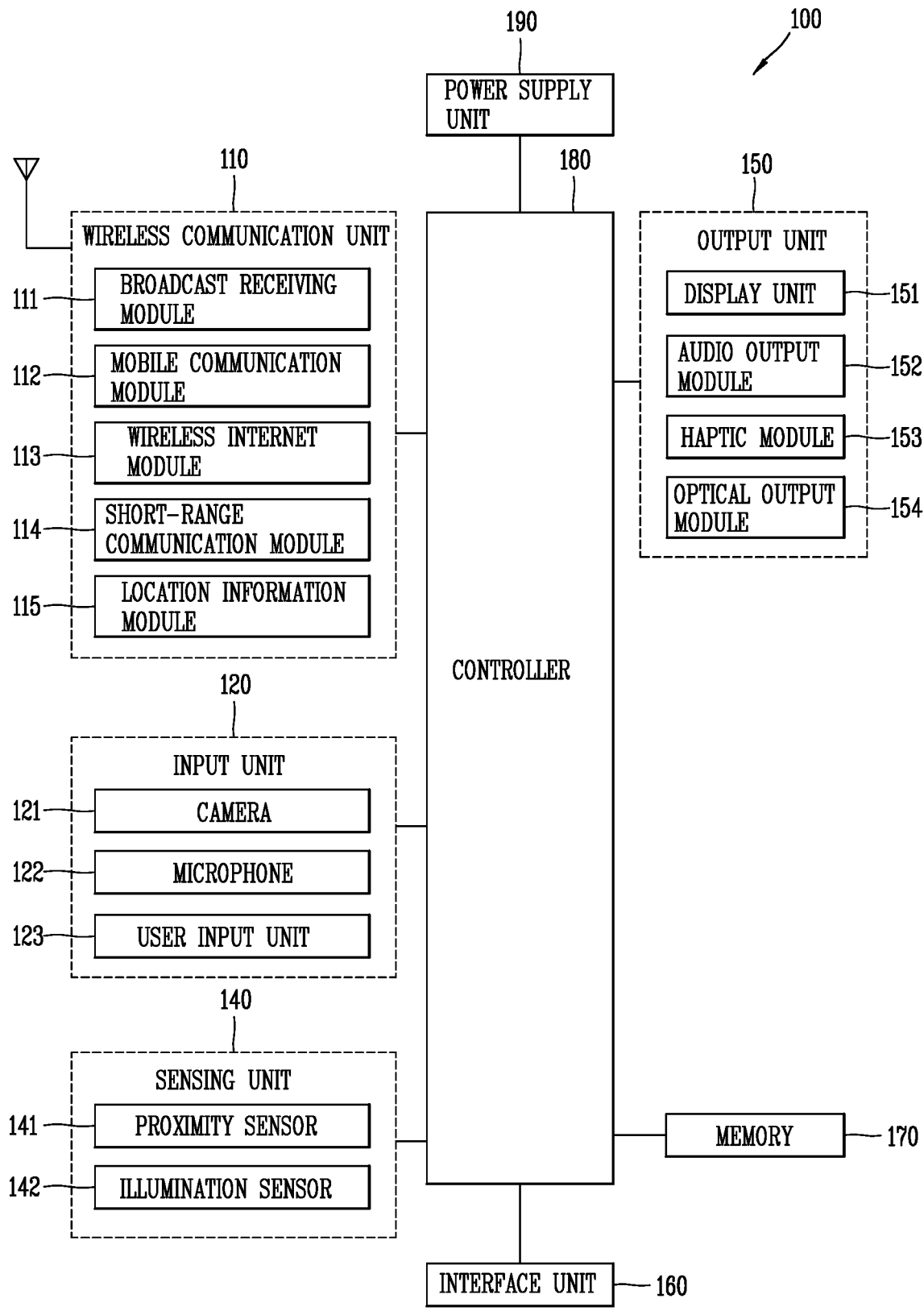
FIG. 1A is a block diagram illustrating a mobile terminal according to an embodiment of the present invention.
Figure 1B:
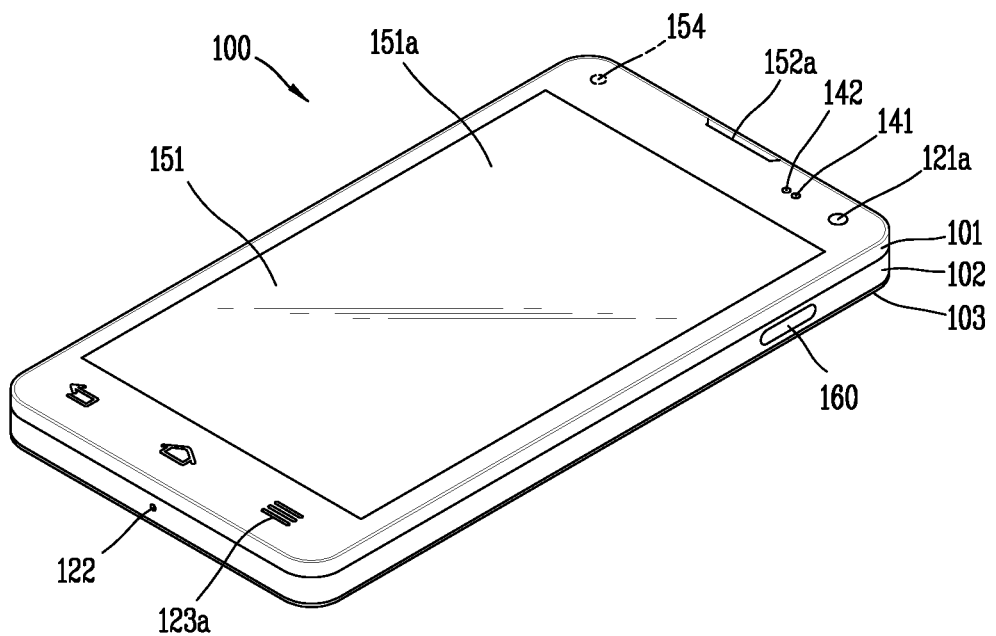
FIGS. 1B and 1C are conceptual views illustrating an example of a mobile terminal according to an embodiment of the present invention, which are viewed from different directions.
Figure 1C:
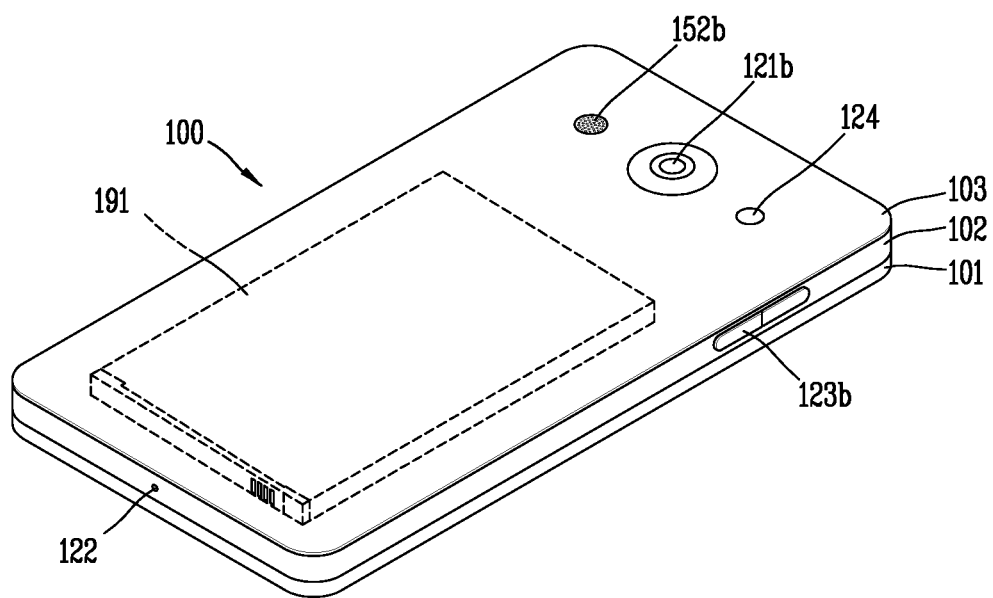

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191 and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a method of extending a payment function of a mobile terminal which includes at least one of the aforementioned components, will be explained in more detail with reference to the attached drawings. An all-in-one card means a single card containing a plurality of card information. Such an all-in-one card has an advantage that a user does not have to carry a plurality of cards, because it is provided with a plurality of card information unlike the conventional credit and check cards.

Hereinafter, the all-in-one card will be explained in more detail. In particular, FIG. 2A is a block diagram to explain an all-in-one card according to an embodiment of the present invention, and FIGS. 2B and 2C are a front view and a rear view of the all-in-one card shown in FIG. 2A, respectively.

Figure 2A:
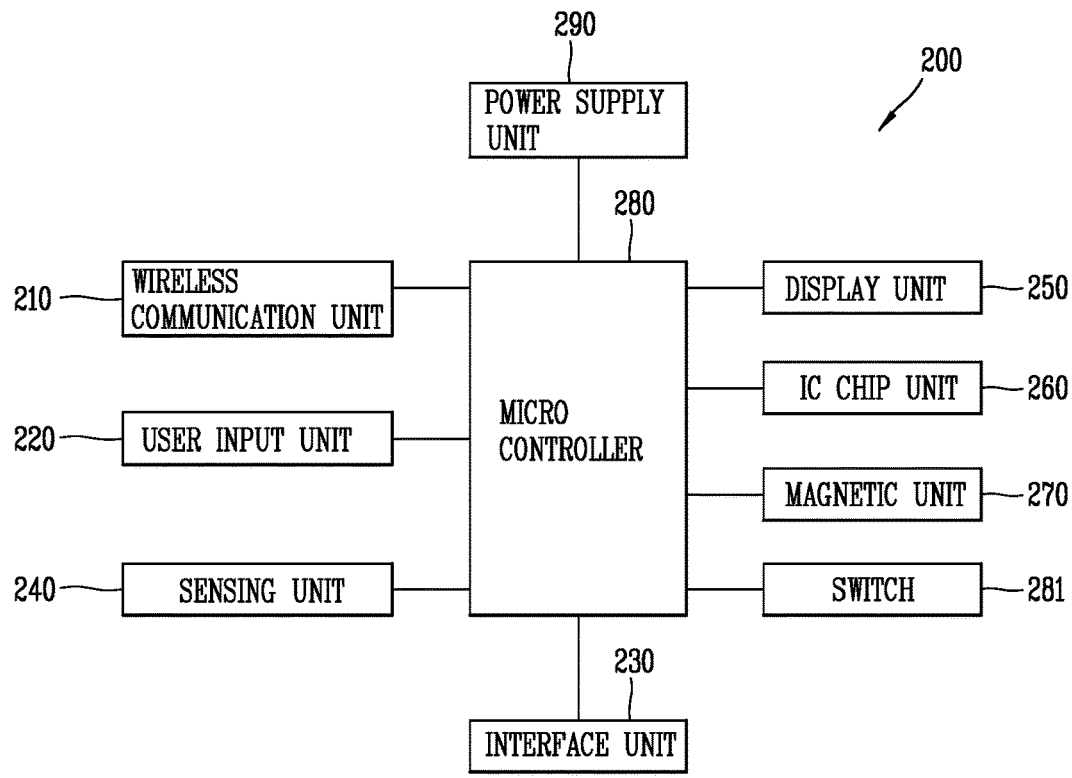
FIG. 2A is a block diagram to explain an all-in-one card according to an embodiment of the present invention.
Figure 2B:
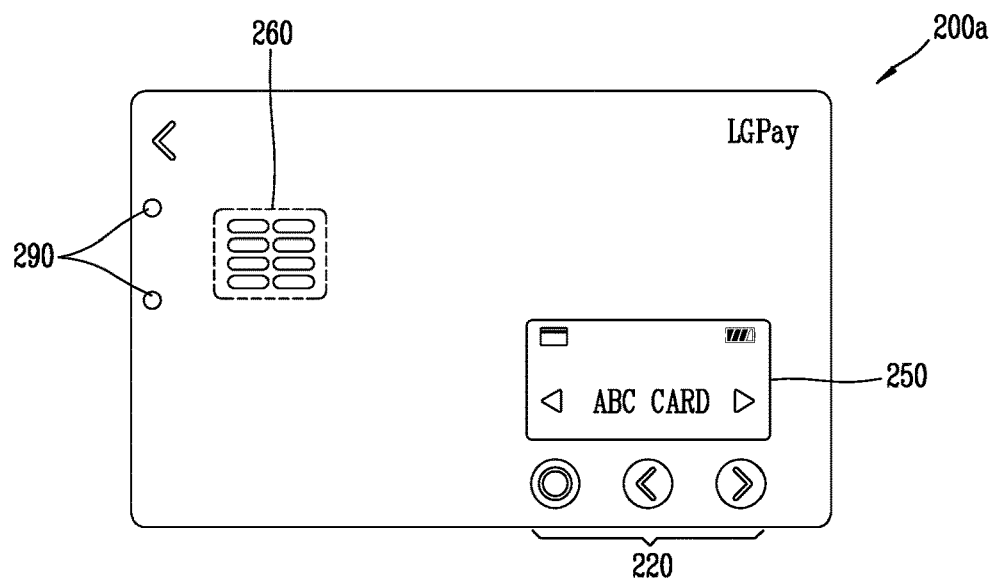
FIGS. 2B and 2C are a front view and a rear view of the all-in-one card shown in FIG. 2A, respectively.
Figure 2C:
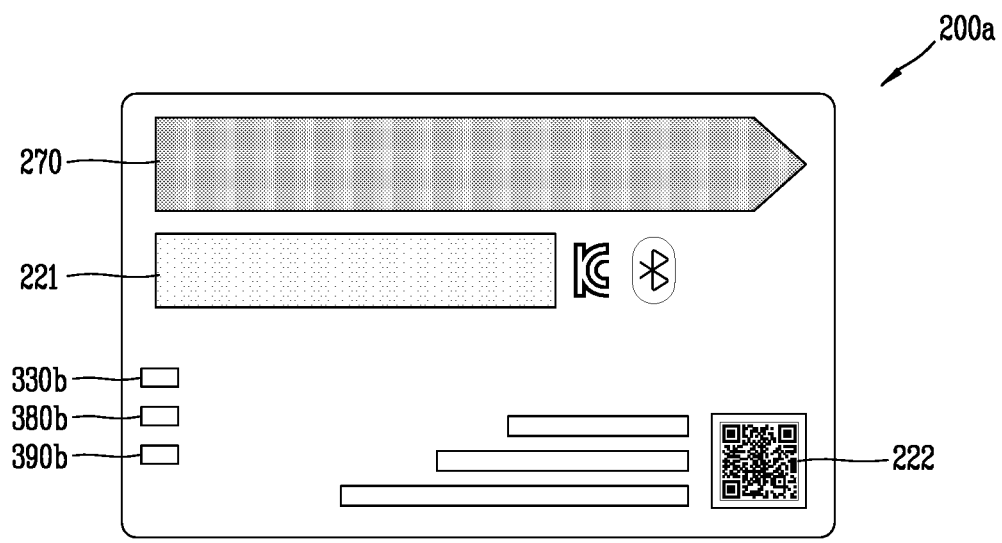

Referring to FIG. 2A, the all-in-one card 200 according to an embodiment of the present invention includes a wireless communication unit 210, a user input unit 220, a sensing unit 240, a display unit 250, an IC chip unit 260, a magnet IC chip unit 270, a micro controller 280, a switch 281, a power supply unit 290, etc. Implementing all of the illustrated components shown in FIG. 2A is not a requirement, and that greater or fewer components may alternatively be implemented.

The wireless communication unit 210 typically includes one or more components which permit wireless communication between the mobile terminal 100 and a wireless communication system or network within which the mobile terminal is located. The wireless communication unit 210 typically includes one or more modules which permit communications with the mobile terminal 100. Further, the wireless communication unit 210 may include one or more modules which connect the mobile terminal 100 to one or more networks.

The wireless communication unit 210 for implementing short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The user input unit 220 is configured to receive information from a user. Once information is input through the user input unit 123, a micro controller 280 may control an operation of the all-in-one card 200, in correspondence to the input information. The user input unit 220 may be formed as a mechanical button or a touch button, etc. Since the user input unit 220 has the same or similar function as or to the user input unit 123 of FIG. 1A, a detailed explanation thereof will be replaced by that of the user input unit 123 of FIG. 1A.

The sensing unit 240 is configured to sense whether there exists a coil related to a payment machine (payment terminal), near the all-in-one card. More specifically, once the all-in-one card 200 contacts a payment machine (a POS device), the sensing unit 240 may sense reception of a specific signal (e.g., a reset signal) from a coil of the payment machine. Once the sensing unit 240 senses the specific signal, the micro controller 280 of the all-in-one card 200 may recognize start of a payment, and may start a payment operation.

The interface unit 230 may serve as an interface with various types of external devices that can be coupled to the all-in-one card 200. The interface unit 230, for example, may include at least one of a wired or wireless data port, an external charger port, and a memory card port. Once an external device is connected to the interface unit 260, a control related to the external device may be executed. For instance, the all-in-one card 200 may transmit card information to a coil disposed on a back cover of the mobile terminal. Here, the back cover may be understood as a rear cover. Hereinafter, it will be understood that the terms of 'back cover' and 'rear cover' indicate the same component.

The display unit 250 may be configured to output information visually. The display unit 250 may have a layered structure with a touch sensor. And the display unit 250 may be a thin e-paper display (EPD) so as not to influence on a thickness of a body of the all-in-one card 200, etc.

The IC chip unit 260, configured to safely store and generate card information, may include one or more modules (components) such as a CPU, a memory, and a security element (SE). The IC chip unit 260 may store therein one or more card information safely, and the card information stored in the IC chip unit 260 may be set not to leak to the outside. The IC chip unit 260 may be formed as an IC 7816 chip, for instance. The IC7816 chip serves to store and generate IC information suitable for standards.

Here, the card information means information related to a card, which may include an identification number of a card, a valid date (effective date), magnetic information, etc. The security module means a hardware module to store an electronic signature, and may have therein an electronic signature generation key such that an electronic signature may not leak to the outside.

The magnetic unit 270, configured to generate a magnetic stripe signal, may be formed as a magnetic strip having magnetic information therein, or as a film having a thin magnetic recoding layer where magnetic information is recorded, or as a coil which converts a current into magnetism. The magnetic unit 270 may generate a magnetic stripe signal, based on information of a user programming magnetic card.

That is, the magnetic unit 270 is not the conventional magnetic strip having one magnetic information therein, but may be formed to generate a magnetic stripe signal based on card information selected according to a user request, among a plurality of card information. That is, the magnetic unit 270 may generate various magnetic stripe signals. The magnetic stripe signal, a magnetic signal includes card information, and is formed according to standards. The magnetic unit 270 may further include a booster, in order to generate a magnetic stripe signal. The booster serves to amplify a current signal.

The micro controller 280 may control the aforementioned components in order to execute payment. For instance, once one card information is selected among plural card information stored in the IC chip unit 260, the micro controller 280 may transmit the selected card information to the magnetic unit 270 for payment, such that a magnetic stripe signal may be transmitted to the outside.

The switch 281 may change an electrical connected relation among components of the all-in-one card, by switching under control of the micro controller 280. For instance, the switch 281 may electrically connect one of the magnetic unit 270 and the interface unit 230 with the micro controller 280, such that card information may be transmitted to either the magnetic unit 270 or the interface unit 230.

The power supply unit 290 is configured to supply power to the components of the all-in-one card 200. The power supply unit 290 includes a chargeable battery, and the battery may be a built-in battery or a replaceable battery. The power supply unit 290 may charge the battery using power received from an exclusive charging cradle of the all-in-one card 200, or using power received from the mobile terminal 100.

The all-in-one card 200 may further include a memory which stores information related to an operation of the all-in-one card 200, a charging protection circuit which protects the battery of the power supply unit, a load switch which executes a switching between the controller and the IC chip unit, etc. The above components have been well known to those skilled in the art, and thus detailed explanations thereof will be omitted.

The all-in-one card 200 may have a rectangular thin body, similarly to the conventional magnetic card. Hereinafter, a front surface and a rear surface of the all-in-one card 200 will be explained. Referring to FIG. 2B, the user input unit 220, the display unit 250, the IC chip unit 260, the power supply unit 290, etc. may be disposed on the front surface of the all-in-one card 200.

The user input unit 220 may be formed as a touch button, and may be configured to receive a user input to control an operation of the all-in-one card 200. The display unit 250 may be disposed on a partial region or an entire region of the front surface of the all-in-one card 200, and may visually output one or more card information stored in the IC chip unit 260. Further, the display unit 250 may have a layered structure with a touch sensor, and may receive a touch input applied to the display unit 250.

The IC chip unit 260, disposed on a partial region of the front surface of the all-in-one card 200, may be formed to contact a contact terminal of a payment machine when inserted into the payment machine. Once the IC chip unit 260 contacts the contact terminal of the payment machine, the payment machine may execute a payment by receiving card information from the IC chip unit 260. The power supply unit 290, disposed on a region of the front surface of the all-in-one card 200, may receive power from an external charging terminal of the all-in-one card 200, by contacting the external charging terminal.

Referring to FIG. 2C, a data terminal 330*b*, a GND terminal 380*b*, a power terminal 390*b*, the magnetic unit 270, a signature region 221, and a QR code 222 may be disposed on the rear surface of the all-in-one card 200. The data terminal 330*b* is a component of the interface unit which serves as a passage to transfer data to the back cover 103 (rear cover 103) of the mobile terminal 100.

The data terminal 330*b* may be disposed on a surface of the all-in-one card 200, the surface facing the back cover of the mobile terminal 100, in order to transfer data to the back cover. For instance, as shown in FIG. 2C, the data terminal 330*b* may be disposed on a rear surface of the all-in-one card 200, such that the rear surface of the all-in-one card 200 may face the back cover. Alternatively, the data terminal 330*b* may be disposed on a front surface of the all-in-one card 200, such that the front surface of the all-in-one card 200 may face the back cover. A user can insert the all-in-one card into the back cover, such that the data terminal 330*b* may face the back cover.

The data terminal 330*b* may be disposed on a position facing a data terminal 330*a* of the back cover (refer to FIG. 3), so as to be electrically connected to the data terminal 330a of the back cover. For instance, as shown in FIG. 2C, the data terminal 330b may be disposed at one side of a rear surface of the back cover. The GND terminal 380b may be disposed on a position facing a GND terminal 380a of the back cover (refer to FIG. 3), so as to be electrically connected to the GND terminal 380a of the back cover.

The power terminal 390b may be disposed on a position facing a power terminal 390a of the mobile terminal (refer to FIG. 3), so as to be electrically connected to the power terminal 390a of the mobile terminal. The power terminal 390b may serve as a passage to receive power from the mobile terminal, by contacting the power terminal 390a of the mobile terminal. The all-in-one card 200 can transfer data to the data terminal or charge the battery, using power received through the power terminal 390b.

Unlike in FIG. 2C, the GND terminal 380b and the power terminal 390b may be disposed on a front surface of the all-in-one card. The magnetic unit 270 may be provided with a magnetic strip, so as to generate a magnetic stripe signal by contacting a payment machine. In this instance, the magnetic strip may be disposed at one edge of a rear surface of the all-in-one card 200. The magnetic strip may be formed as a dynamic coil so as to generate a magnetic stripe signal of a card selected by a user. That is, the magnetic unit 270 may be formed as a dynamic coil which generates various magnetic stripe signals, not a magnetic strip which stores therein single magnetic information.

The signature region 221 is a region where a user's signature is input for recognition of a user of the all-in-one card 200. A user can input his or her signature to the signature region 221, using a writing tool (e.g., a ball pen). The QR code 222 may store information therein after converting the information into a two-dimensional image code. The QR code 222 may include information on a lost card service center, contact information about a card owner, etc.

So far, the all-in-one card 200 has been explained. Hereinafter, for convenience, the term of 'all-in-one card' 200 will be replaced by a general term of 'card.' Hereinafter, a structure of the back cover of the mobile terminal according to an embodiment of the present invention will be explained.

Figure 3:
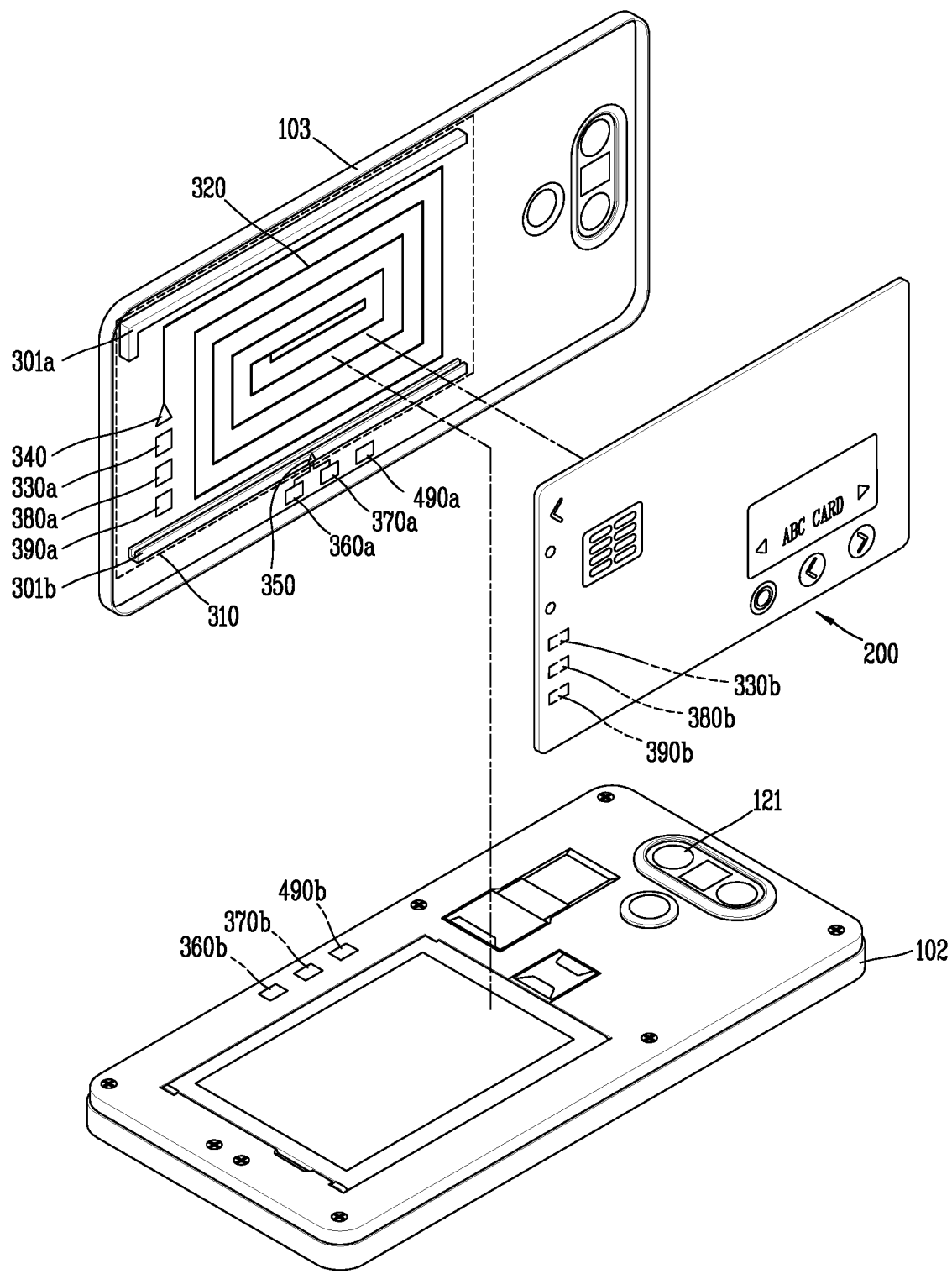
FIG. 3 is a view illustrating a separated state of a back cover and a rear case of a mobile terminal according to an embodiment of the present invention.

In particular, FIG. 3 is a view illustrating a separated state of the back cover and the rear case of the mobile terminal according to an embodiment of the present invention. A coupling structure between the back cover and the card may be included in one surface of the back cover 103 (refer to FIG. 1C) of the mobile terminal according to an embodiment of the present invention.

More specifically, as shown in FIG. 3, an inner surface of the back cover 103 of the mobile terminal includes an accommodation unit 310, a coil 320, a data terminal 330a, a booster 340, a sensing button 350, sensing terminals 360a, 360b, a power terminal 390a, a GND terminal 380a, and a contact terminal 490a. Here, the inner surface of the back cover means a surface facing the rear case 102 when the back cover 103 is mounted to the rear case 102 of the mobile terminal 100. And an outer surface of the back cover 103 means an opposite surface to the inner surface.

The accommodation unit 310 may be formed to accommodate the card 200 therein, on the back cover 103. That is, as the accommodation unit 310 accommodates the card 200 therein, the card 200 may be coupled to the back cover 103. The accommodation unit 310 may further include a pair of guide rails 301a, 301b and a fixing portion, in order to accommodate the card 200 therein.

The pair of guide rails 301a, 301b are spaced apart from each other by a distance corresponding to a width of the card. The pair of guide rails 301a, 301b are formed to guide an insertion direction and a withdrawal direction of the card. That is, a user can insert the card to the inner surface of the back cover, along the guide rails 301a, 301b. Here, the insertion of the card may be understood as accommodation or insertion of the card into the accommodation unit of the back cover.

The pair of guide rails 301a, 301b may be formed to have a length shorter than that of the card. In addition, the pair of guide rails 301a, 301b can protrude from the inner surface of the back cover 103. The pair of guide rails 301a, 301b can be provided with a recessed groove at a central part thereof such that the card may be fixed. A user can thus couple the card with the back cover, by inserting two ends of the card into the recessed groove.

Further, the fixing unit may extend from one end of the guide rails 301a, 301b, thereby fixing the card accommodated in the accommodation unit. The fixing unit may fix one end of the card physically or electrically, in order to prevent the card from moving on the inner surface of the back cover.

The coil 320 is configured to convert a current signal into a magnetic signal, and to transmit the magnetic signal to the outside. The coil 320 is also positioned on the inner surface of the back cover 103, or may be mounted to the back cover 103 so as not to be viewable from the outside. For instance, the coil 320 may be attached to a region between the inner surface and the outer surface of the back cover 103.

The coil 320 can also be positioned such that a magnetic signal sent from the coil 320 is not disturbed by the card accommodated in the accommodation unit 310. For instance, as shown in FIG. 3, the coil 320 may be positioned at a region farther than the card 200, based on the rear case 102. That is, if the card 200 is positioned on the inner surface of the back cover 103, the coil 320 may be positioned at a region closer to the outer surface of the back cover 103, than the card 200.

As another example, the coil 320 may be disposed at a region not overlapping the accommodation unit 310 of the back cover 103, e.g., a region near the camera 121. With such a configuration, a change of an output path of a magnetic signal sent from the coil 320, by the card 200 may be prevented. Further, a problem that the output path does not reach a payment machine may be prevented.

The data terminal 330a may serve as a passage for transceiving (transmitting and receiving) data from the data terminal 330b (refer to FIG. 2B) which exists on the card 200. The data terminal 330a may be disposed to face the data terminal 330b which exists on the card 200 accommodated in the accommodation unit 310, and may be electrically connected to the data terminal 330b of the card 200.

Once data (e.g., card information) is received from the data terminal 330b, the booster 340 may amplify a current signal including the data. Then, the booster 340 may transfer the amplified current signal to the coil 320, such that the amplified current signal may be converted into a magnetic signal.

The sensing button 350 and the sensing terminals 360a, 370a may be formed to sense whether the card 200 has been inserted into the accommodation unit 310. The sensing button 350, a physical button module, may be positioned at one region of the guide rail 301b.

The sensing button 350 may be pressed as the card 200 is inserted into the accommodation unit 310. As the sensing button 350 is pressed, the sensing terminals 360a, 370a may be electrically connected to each other. In this instance, the sensing terminals 360a, 370a may be grounded to have a voltage of '0'. As the voltage of the sensing terminals 360a, 370a becomes zero, the controller 180 can recognize insertion of the card 200. The sensing terminals 360a, 370a may be disposed at a position facing the sensing terminals 360b, 370b of the rear case 102. One of the sensing terminals 360a, 370a may be grounded.

FIG. 3 illustrates only a physical button module for sensing an inserted state of the card. However, the sensing button may be formed as an electric module using a magnetic hall sensor, and may not be limited to this. The GND terminal 380a serves as a passage which connects the card 200 with a ground of the back cover 103.

The power terminal 390a is connected to the power terminal 390b (refer to FIG. 2B) of the card 200, and serves as a passage which supplies power to the card 200. Further, the power terminal 390a may be connected to the contact terminal 490a connected to the battery of the mobile terminal, thereby supplying power received from the battery of the mobile terminal to the card 200. The power terminal 390a may be disposed at a position facing the power terminal 390b of the card 200 inserted into the accommodation unit 310.

The contact terminal 490a may receive power from the battery disposed at the rear case of the mobile terminal, and may transfer the received power to the power terminal 390a. The contact terminal 490a may be disposed at a position facing the power terminal 490b disposed at the rear case of the mobile terminal.

So far, has been explained the structure of the back cover to cover the card of the present invention with the back cover. With such a configuration, in the present invention, the card may be coupled onto the back cover, and a card-related payment may be executed by using the mobile terminal.

Figure 4:
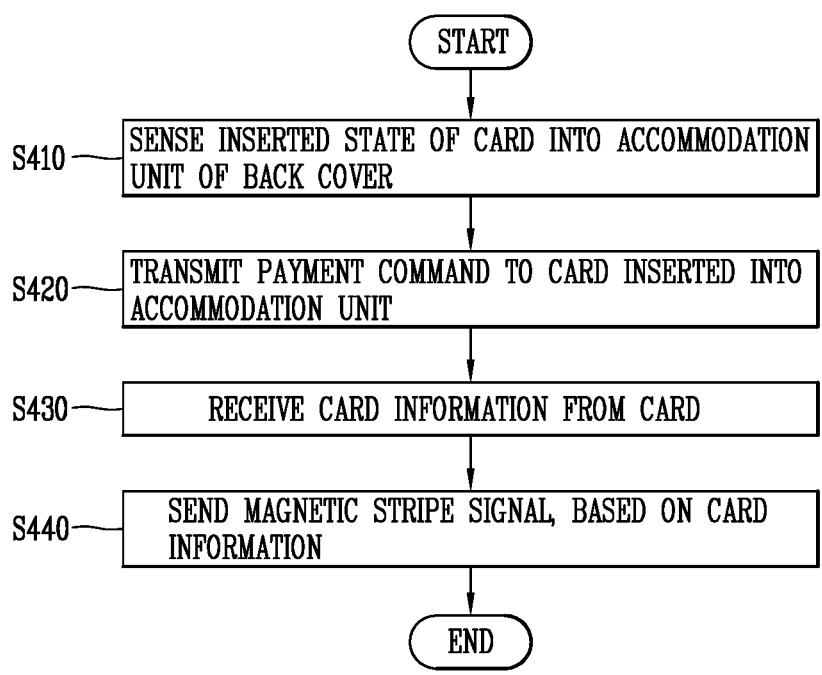
FIG. 4 is a flowchart illustrating a payment method using a card having been inserted into a back cover, in a mobile terminal according to an embodiment of the present invention.

Hereinafter, a method to provide a payment service using the card inserted into the back cover will be explained. In particular, FIG. 4 is a flowchart illustrating a method to execute a payment using the card inserted into the back cover, in the mobile terminal according to an embodiment of the present invention.

Firstly, the controller of the mobile terminal can sense that the card has been inserted into the accommodation unit of the back cover (S410). Once the card 200 is inserted into the accommodation unit, the sensing button 350 of the back cover 103 is pressed by the card 200, along the guide rails 301a, 301b of the back cover 103.

Once the sensing button 350 is pressed, the sensing terminals 360a, 370a connected to the sensing button 350 are electrically connected to each other. In this instance, a voltage of the sensing terminals 360a, 370a can be converted into zero.

The controller 180 can receive a sensing signal indicating an inserted state of the card into the accommodation unit 310, from the sensing terminals 360b, 370b disposed at the rear case 102 electrically connected to the sensing terminals 360a, 370a of the back cover 103. The sensing signal indicates that a power of the sensing terminals 360b, 370b becomes zero.

Once the sensing signal is received, the controller 180 can determine an inserted state of the card 200 into the back cover 103. That is, the controller 180 can determine whether the card 200 has been normally inserted into the back cover 103. The normal insertion of the card means that insertion of the card into a position where data transception (transmission and reception) between the card and the mobile terminal can be stably executed, and where the card can receive power from the mobile terminal. On the contrary, abnormal insertion of the card means insertion of the card into a position rather than the normal insertion position, which indicates an inferior state of data transception or an inferior state of power supply.

The controller 180 can sense a voltage level of the card 200, in order to determine whether the card 200 has been normally inserted into the back cover 103. More specifically, a voltage level of the card 200 can be sensed through the power terminals 390a, 390b of the back cover 103 and the card 200. Then, the controller 180 can receive the sensed voltage level through the contact terminals 490a, 490b disposed at the back cover 103 and the rear case 102 of the mobile terminal.

Here, if a voltage level of the card 200 is sensed, the controller 180 can determine it as normal insertion of the card 200. Further, if a voltage level of the card 200 is not sensed, the controller 180 can determine it as abnormal insertion of the card 200.

In case of abnormal insertion of the card, the controller 180 can output notification information indicating the abnormal insertion. A user can recognize the abnormal insertion of the card through the notification information, and then may insert the card to the back cover in a normal manner. In case of normal insertion of the card, the controller 180 can continuously execute the following steps.

After sensing the insertion of the card into the back cover 103, the controller 180 can transmit a payment request to the card 200 having been inserted into the accommodation unit 310 (S420). Once the card 200 is inserted into the accommodation unit, the controller 180 can execute a payment application. The payment application is an application program which provides payment-related functions.

The payment application can interwork with the card having been inserted into the accommodation unit 310. For instance, if the card having been inserted into the accommodation unit 310 is a first card, a first payment application can be executed. And if the card having been inserted into the accommodation unit 310 is a second card, a second payment application can be executed.

The payment application can be executed according to a user's selection, or automatically when the card 200 is inserted into the accommodation unit 310. For instance, when the card 200 is inserted into the accommodation unit 310, the controller 180 can display a pop-up window on the display unit 151 such that a user can select whether to execute the payment application or not. In this instance, the controller 180 can immediately execute the payment application without a pop-up window.

Figure 5A:
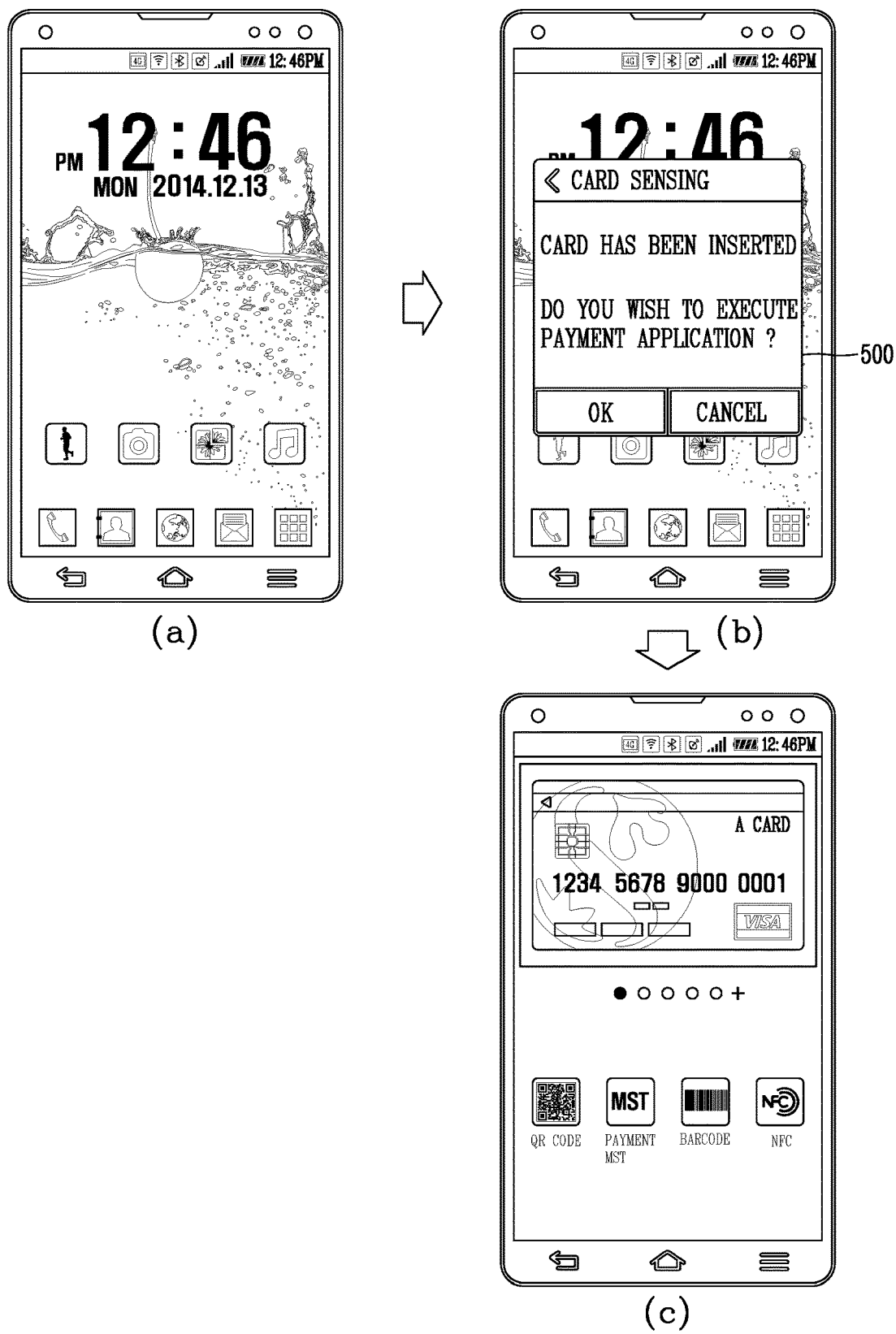
FIGS. 5A and 5B are conceptual views illustrating a control method when a card is inserted into a back cover of a mobile terminal according to an embodiment of the present invention.

As shown in FIG. 5A(c), an execution screen of the payment application may include thereon one or more card information stored in the card having been inserted into the accommodation unit 310. A user can be provided with the one or more card information visually through the display unit 151 of the mobile terminal, and select a card to be used for payment, among the one or more card information.

Once the card 200 is inserted into the accommodation unit 310, the controller 180 can transceive (transmit or receive) data with the card 200, wirelessly or by wire. For instance, the controller 180 can transceive data with the card 200 wirelessly, via Bluetooth. Alternatively, the controller 180 can transceive data with the card 200 by wireless, through a USB port.

For this, when the card 200 has been inserted into the accommodation unit 310, the controller 180 can control the card 200, the wireless communication unit 110 or the interface unit 160. More specifically, when the card 200 has been inserted into the accommodation unit 310, the controller 180 can determine an activated state of the wireless communication unit 110.

Then, the controller 180 can perform communication with the card 200, through the wireless communication unit 110. Here, the activated state of the wireless communication unit 110 means a state where communication through the wireless communication unit 110 is executable as power is supplied to the wireless communication unit 110. And an opposite state to the activated state is defined as a deactivated state. A detailed method to control the wireless communication unit 110 will be explained with reference to FIG. 8.

The card 200 may be a card of which identification information is pre-stored in the mobile terminal 100, before execution of communication between the card 200 and the mobile terminal 100. That is, a user can pre-store identification information of the card 200 in the mobile terminal 100, such that the card 200 and the mobile terminal 100 can recognize with each other.

If identification information of the card 200 is not pre-stored in the mobile terminal 100, the controller 180 can not execute communication with the card 200. In this instance, a user can store the identification information of the card 200 in the mobile terminal 100, before execution of communication.

Storing identification information in the card 200 can be executed in the same manner as storing card information in the all-in-one card 200. That is, the storage can be executed through an exclusive cradle or an exclusive server. A method to store card information in the all-in-one card 200 has been well known to those skilled in the art, and thus a detailed explanation thereof will be omitted.

After the execution of the payment application, the controller 180 can transmit a payment request to the card having been inserted into the accommodation unit 310, through communication. For instance, once a user's request for transmission of a payment request is input, the controller 180 can transmit a payment request to the card 200 via Bluetooth.

The controller 180 can provide power to the card 200, together the payment request. More specifically, the controller 180 can transmit power stored in the battery to the back cover 103, through the contact terminals 490a, 490b. Then, the power transmitted to the back cover 103 can be transmitted to the card 200, through the power terminals 390a, 390b.

Once power is supplied from the mobile terminal to the card 200, the card 200 can supply the power to the battery thereof, through a charging IC. Then, the card 200 can use the power received from the mobile terminal, as power required to transmit card information to the back cover 103.

After the sending of the payment request, the coil disposed at the back cover of the mobile terminal can receive card information from the card, through the data terminals (S430). Once the payment request is transmitted from the controller 180 through communication, the card 200 can control a payment path, a transfer path of card information which exists in the card 200.

More specifically, the card 200 can be provided with a first path and a second path for transferring card information. The first path indicates a path along which card information included in the IC chip unit 260 is transferred to the magnetic unit 270, and the second path indicates a path along which the card information included in the IC chip unit 260 is transferred to the coil 320 of the back cover 103.

The card 200 can further include the switch 281 configured to execute a switching operation between the first and second paths, such that card information may be transferred to one of the first and second paths. The card 200 can control the switch 281 such that card information may be transferred to the back cover 103, once the payment request is transmitted from the controller 180. Then, the card 200 can transmit card information stored therein, to the back cover 103, through the data terminals 330a, 330b. The control method will be explained in more detail with reference to FIGS. 6 and 7.

Once the card information is transmitted to the back cover 103 through the data terminals 330a, 330b, the booster 340 of the back cover 103 can convert the card information into a current signal including the card information, and amplify the current signal. Then, the current signal amplified by the booster 340 is transferred to the coil 320 of the back cover 103, thereby being converted into a magnetic stripe signal. The converted magnetic stripe signal can be sent to the outside (S440).

Once the current signal amplified by the booster 340 is received, the coil 320 of the back cover 103 can generate a magnetic stripe signal and send the generated magnetic stripe signal to the outside. The magnetic stripe signal can reach a payment machine disposed around the mobile terminal. The payment machine can convert a magnetic signal due to an electromotive force generated by the magnetic stripe signal, into a current signal, thereby decoding card information.

So far, a method to execute a payment in a non-contact manner using a card which can execute a payment only in a contact manner has been explained. In the present invention, a user can execute a payment in a non-contact manner, using a card which can execute a payment only in a contact manner. This allows a user to execute a payment in a contact or non-contact manner according to a situation, using a card which can execute a payment only in a contact manner.

Figure 5B:
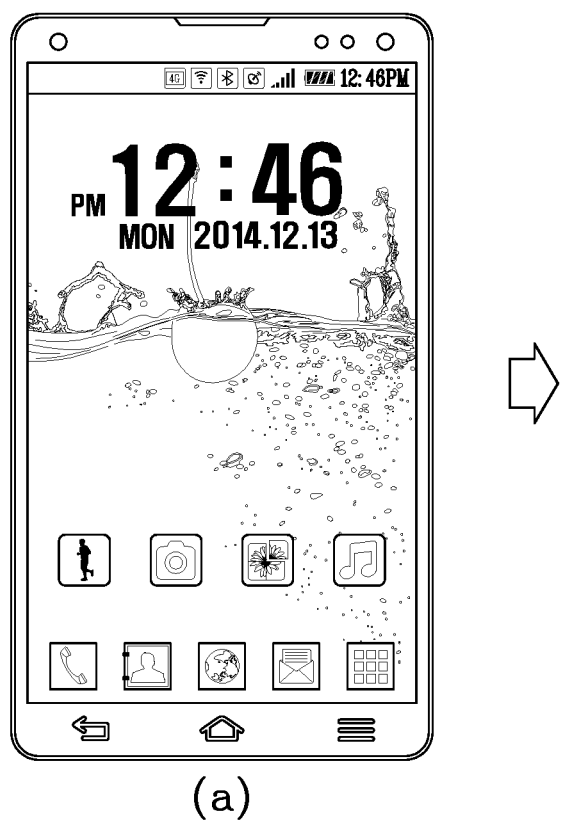
Figure 5B:
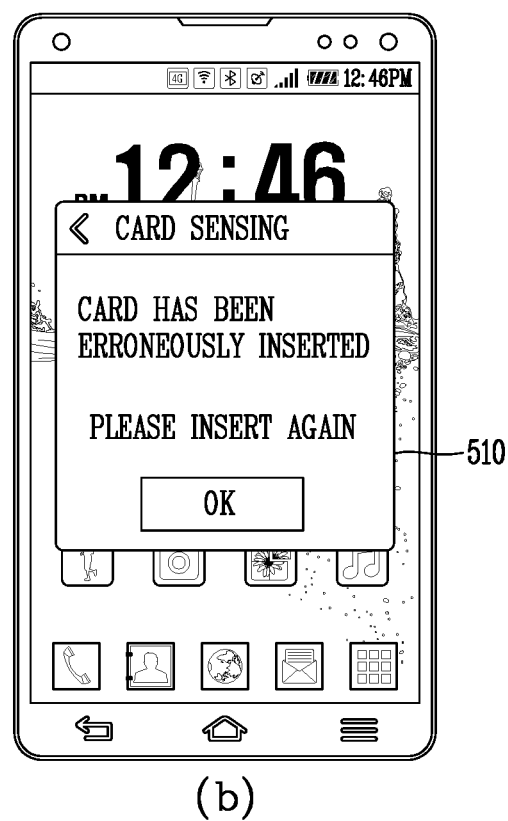

Hereinafter, a control method based on identification information of the card inserted into the back cover will be explained. In particular, FIGS. 5A and 5B are conceptual views illustrating a control method based on identification information of the card inserted into the back cover.

Once the card is inserted into the back cover 103, the controller 180 can check identification information of the card through communication. More specifically, the controller 180 can receive identification information of the card from the card, and compare the received identification information with identification information stored in the memory 170.

If the identification information of the card having been inserted into the back cover 103 is consistent with the identification information stored in the memory 170, the controller 180 can execute a payment application.

As shown in FIGS. 5A(a) and (b), once an inserted state of the card is sensed, the controller 180 can output a pop-up window 500 such that a user can select whether to execute a payment application or not. The pop-up window 500 may include information inquiring whether to execute a payment application or not, as well as information indicating the inserted state of the card. A user can execute a payment application through the pop-up window 500.

In this instance, as shown in FIG. 5A(c), an execution screen of the payment application can be displayed on the display unit 151. The execution screen of the payment application may include card information, icons for selecting a payment type, etc.

If the identification information of the card having been inserted into the back cover 103 is consistent with the identification information stored in the memory 170, the controller 180 can not communicate with the card. In this instance, the controller 180 can not execute a payment application, either. As shown in FIGS. 5B(a) and (b), the controller 180 can output a pop-up window 510 indicating an inserted state of an erroneous card. In this instance, a user can remove the erroneous card having been inserted into the back cover.

So far, an operation of the mobile terminal has been explained, based on identification information of the card having been inserted into the back cover. That is, in the present invention, a payment using another user's card can be restricted as identification information of the card inserted into the back cover is determined. This enhances security when a user executes a payment using the mobile terminal and the card in a coupled manner.

Figure 6A:
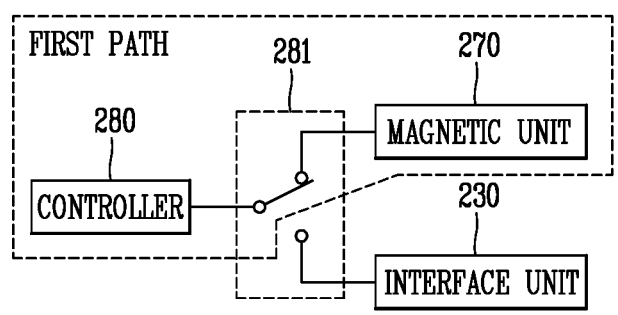
FIGS. 6A and 6B are conceptual views illustrating an information transfer path inside a card.
Figure 6B:
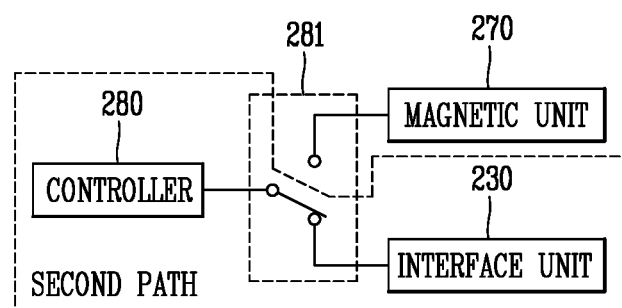
Figure 7:
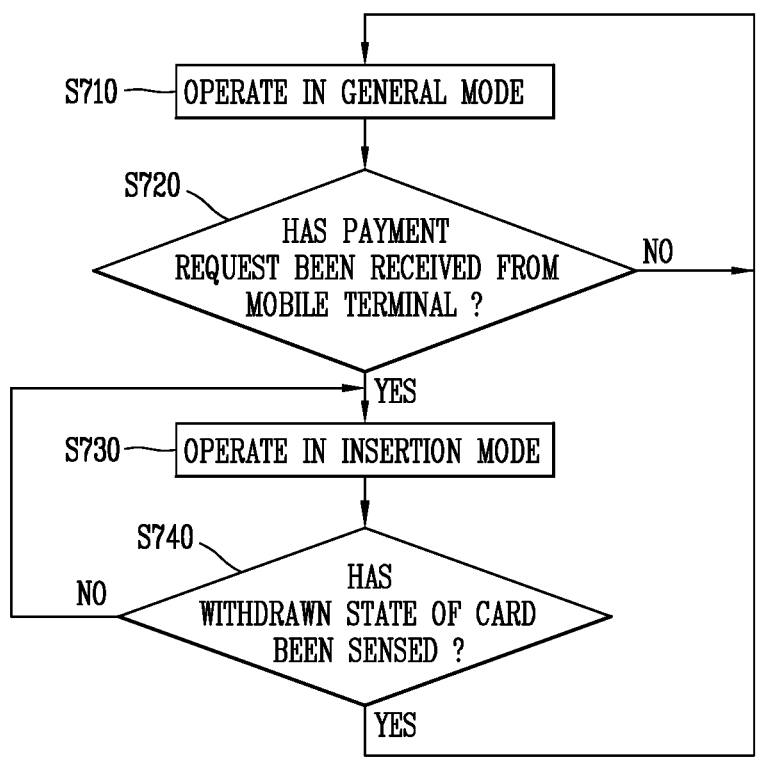
FIG. 7 is a flowchart illustrating an operation of a card.

Hereinafter, an operation of the card insertable into the back cover will be explained. In particular, FIGS. 6A and 6B are conceptual views illustrating an information transfer path inside the card, and FIG. 7 is a flowchart illustrating an operation of the card.

The card 200 according to an embodiment of the present invention can operate in a general mode where the card 200 has not been inserted into the back cover 103, and in an insertion mode where the card 200 has been inserted into the back cover 103. In the general mode, the card 200 can execute a payment by itself. For instance, a user can execute a payment by contacting the card 200 onto a payment machine.

In the insertion mode, a user can execute a non-contact type payment near a payment machine, as card information stored in the card 200 is transmitted to the back cover 103 of the mobile terminal. In this instance, the user can execute a payment by merely making the mobile terminal approach the payment machine, without contacting the mobile terminal onto the payment machine.

The card 200 can operate either in the general mode, or in the insertion mode. That is, the two modes are not implemented at the same time. The micro controller 280 of the card 200 can control the switch 281 such that the card 200 can operate in one of the general mode and the insertion mode.

More specifically, as shown in FIG. 6A, the micro controller 280 can control the switch 281 such that card information for executing a payment can be transmitted to the magnetic unit 270, in the general mode. In this instance, the card can execute a contact-type payment, using a magnetic stripe signal sent from the magnetic unit 270. Hereinafter, a path along which card information is transmitted to the magnetic unit 270 will be referred to as a 'first path'.

As shown in FIG. 6B, the micro controller 280 can control the switch 281 such that card information for executing a payment is transmitted to the back cover 103 through the interface unit 230, in the insertion mode. In this instance, the coil of the back cover 103 can send a magnetic stripe signal to the outside, based on the card information. Accordingly, a user can execute a non-contact type payment. Hereinafter, a path along which card information is transmitted to the interface unit 230 will be referred to as a 'second path'.

That is, the micro controller 280 can control the switch 281 such that card information can be transmitted along one of the first and second paths. Accordingly, the card 200 can prevent interference between magnetic signals occurring from the two paths, the interference resulting from that card information is transmitted along the two paths.

Hereinafter, a method to change an operation mode of the card 200 will be explained in more detail with reference to FIG. 7. The micro controller 280 of the card can operate in one of the general mode and the insertion mode, according to a user request or a preset condition. The preset condition may be a coupling condition between the card 200 and the back cover 103.

Firstly, the micro controller 280 of the card can operate in the general mode (S710). In this instance, the micro controller 280 can control the card 200 such that a payment can be executed when the card 200 contacts a payment machine.

In the general mode, the micro controller 280 can determine whether a payment request is received from the mobile terminal or not (S720). Once a payment request is received from the mobile terminal through communication, the micro controller 280 can recognize that the card 200 has been inserted into the back cover 103.

In this instance, the micro controller 280 can change the general mode into the insertion mode (S730). More specifically, the micro controller 280 can change a transfer path of card information to the second path from the first path using the switch 281, in order to operate in the insertion mode.

In the insertion mode, the micro controller 280 can transfer card information to the back cover 103 along the second path. Further, the micro controller 280 can be supplied with power from the back cover 103, through the power terminals 390a, 390b.

The micro controller 280 can continuously operate in the general mode, unless a payment request is received from the mobile terminal. In the insertion mode, the micro controller 280 can determine whether a withdrawal signal, indicating a withdrawn state of the card 200 from the back cover 103, has been received or not (S740).

In the insertion mode, the micro controller 280 can receive the withdrawal signal. Once the withdrawal signal is received, the micro controller 280 can change the insertion mode into the general mode. That is, the micro controller 280 of the card 200 can not transmit card information to the back cover 103 any longer.

In this instance, the micro controller 280 can control the switch 281 such that card information may be transferred along the first path. If the withdrawal signal is not received, the micro controller 280 can continuously operate in the insertion mode.

In the above descriptions, an operation state of the card 200 is converted based on a payment request and a withdrawal signal received from the mobile terminal. However, the card 200 can further include sensing modules configured to sense whether the card has been inserted into the back cover or not. In this instance, unlike in the aforementioned descriptions, the card 200 can sense its inserted or withdrawn state using the sensing modules provided thereat, and accordingly may operate in the general mode or the insertion mode.

So far, the operation of the card through coupling with the back cover has been explained. More specifically, the card operates in one of the general mode and the insertion mode, and card information is transmitted along a different transfer path in each mode. This may prevent interference between the magnetic coil of the card and the magnetic coil of the mobile terminal.

Figure 8:
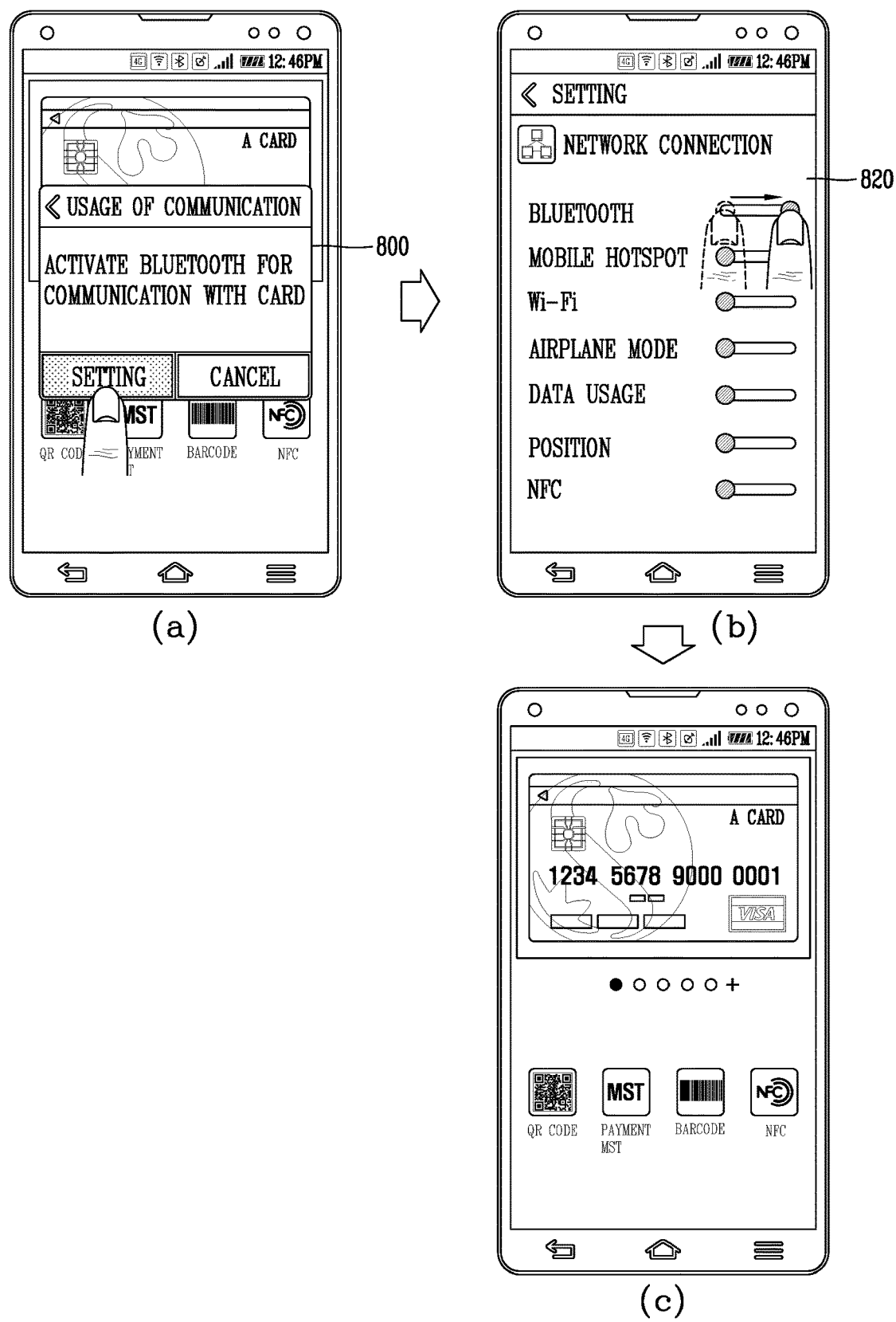
FIG. 8 is a conceptual view illustrating a method to control a communication state of a mobile terminal when a card is inserted into a back cover.

Hereinafter, a method to control a communication state of the mobile terminal when the card is inserted into the back cover will be explained. In particular, FIG. 8 is a conceptual view illustrating a method to control a communication state of the mobile terminal when the card is inserted into the back cover.

Once an inserted state of the card 200 into the back cover 103 is sensed, the controller 180 can control the wireless communication unit 110 in order to execute communication with the card 200. Firstly, the controller 180 can determine an activated state of the wireless communication unit 110. Here, the activated state means a state where the mobile terminal can transceive (transmit and receive) data with an external device through the wireless communication unit 110. And a deactivated state means a state where the mobile terminal cannot transceive data with an external device through the wireless communication unit 110.

In an activated state of the wireless communication unit 110, the controller 180 can execute communication with the card 200. That is, the controller 180 can control the mobile terminal to be in a state where data can be transmitted to the card 200 or data can be received from the card 200.

In a deactivated state (non-activated state) of the wireless communication unit 110, the controller 180 can convert the deactivated state into an activated state, for communication with the card 200. In this instance, the controller 180 can automatically convert the deactivated state into the activated state, or may convert the deactivated state into the activated state based on a user's selection whether to activate the wireless communication unit 110 or not.

For instance, as shown in FIG. 8(a), the controller 180 can display, on the display unit 151, a pop-up window 800 for selecting whether to activate a Bluetooth module or not. A user can be provided with screen information 820 (refer to FIG. 8(b)) for selecting whether to activate a Bluetooth module or not, using the pop-up window 800.

As shown in FIG. 8(b), the controller 180 can activate a Bluetooth module when a user's request for activation of the Bluetooth module is received. Then, as shown in FIG. 8(c), the controller 180 can execute communication with the card 200, through the activated Bluetooth module.

In this instance, the same control can be executed through an NFC module rather than the Bluetooth module. As aforementioned, the card and the mobile terminal may communicate with each other wirelessly or by wire. For this, the card and the back cover may further include signal transmission terminals. That is, in the present invention, data can be transmitted and received by wire, through the signal transmission terminals. In this instance, the signal transmission terminals can transmit and receive data without being controlled for activation or deactivation.

So far, a method to execute communication between the card and the mobile terminal when the card has been inserted into the back cover has been explained. In the present invention, transmission and reception of a control command between the card and the mobile terminal can be executed via wireless communication.

Figure 9:
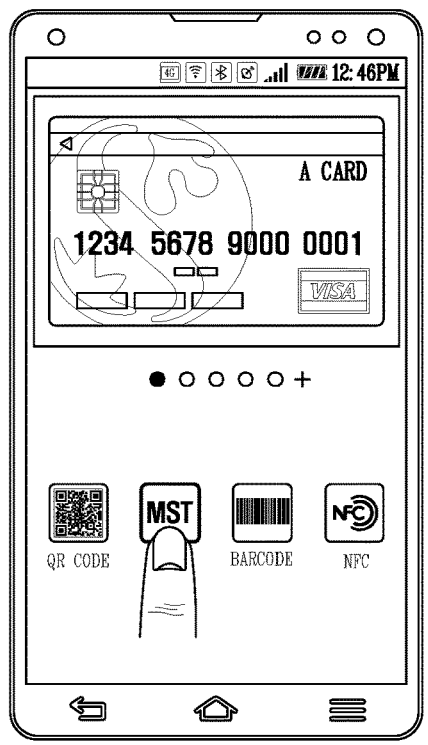
FIG. 9 is a conceptual view illustrating a process of executing a payment in a mobile terminal according to an embodiment of the present invention.
Figure 9:
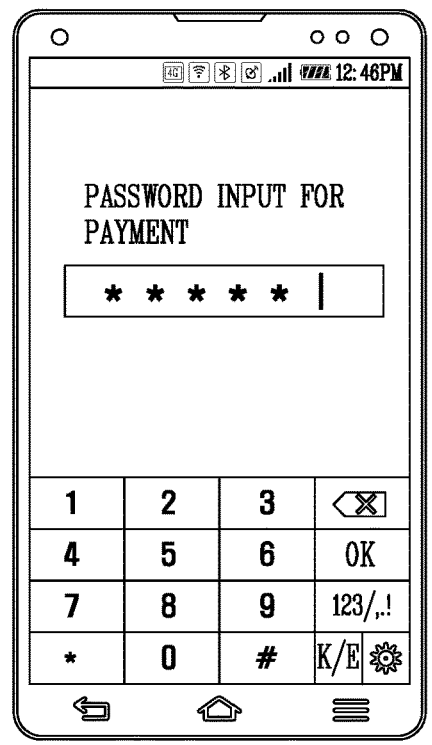
Figure 9:
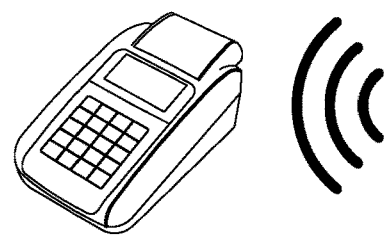
Figure 9:
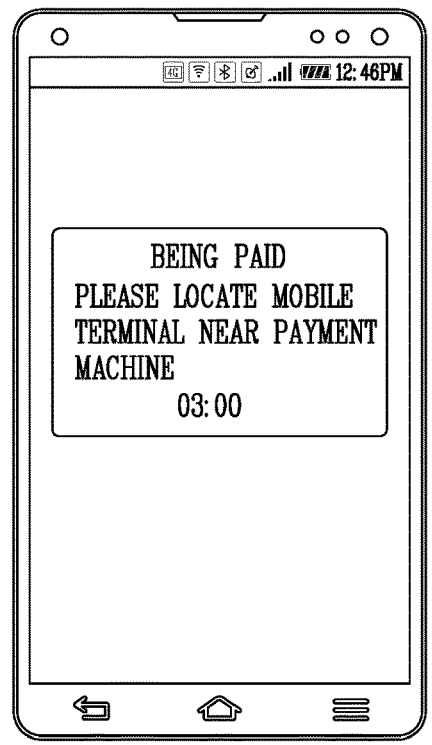

Hereinafter, a method to execute a payment in an inserted state of the card into the back cover, will be explained. In particular, FIG. 9 is a conceptual view illustrating a process of executing a payment in the mobile terminal according to an embodiment of the present invention.

As aforementioned, the controller 180 can execute a payment application when the cover 200 is inserted into the back cover 103. As shown in FIG. 9(a), the controller 180 can receive a payment request from a user, while a payment application is being executed.

Then, the controller 180 can execute an authentication procedure for payment. The authentication procedure may be performed through a fingerprint recognition, an input of a payment password, etc. For instance, as shown in FIG. 9(b), an authentication through an input of a payment password can be executed.

Upon completion of the authentication, the controller 180 can transmit a payment request to the card 200 as shown in FIG. 9(c). Then, the card 200 can send a magnetic stripe signal to the outside using the coil 320 of the back cover 103, in the order aforementioned in FIG. 4. A payment machine disposed near the mobile terminal can receive the magnetic stripe signal, and execute a payment based on the received magnetic stripe signal.

So far, a method to execute a payment in the mobile terminal according to an embodiment of the present invention has been explained. In the present invention, a non-contact type payment can be executed by using a card which can execute a payment only in a contact manner. Further, when a payment is not executable as power of the card which can execute a payment only in a contact manner is not sufficient, a non-contact type payment can be executed through the mobile terminal.

Figure 10:
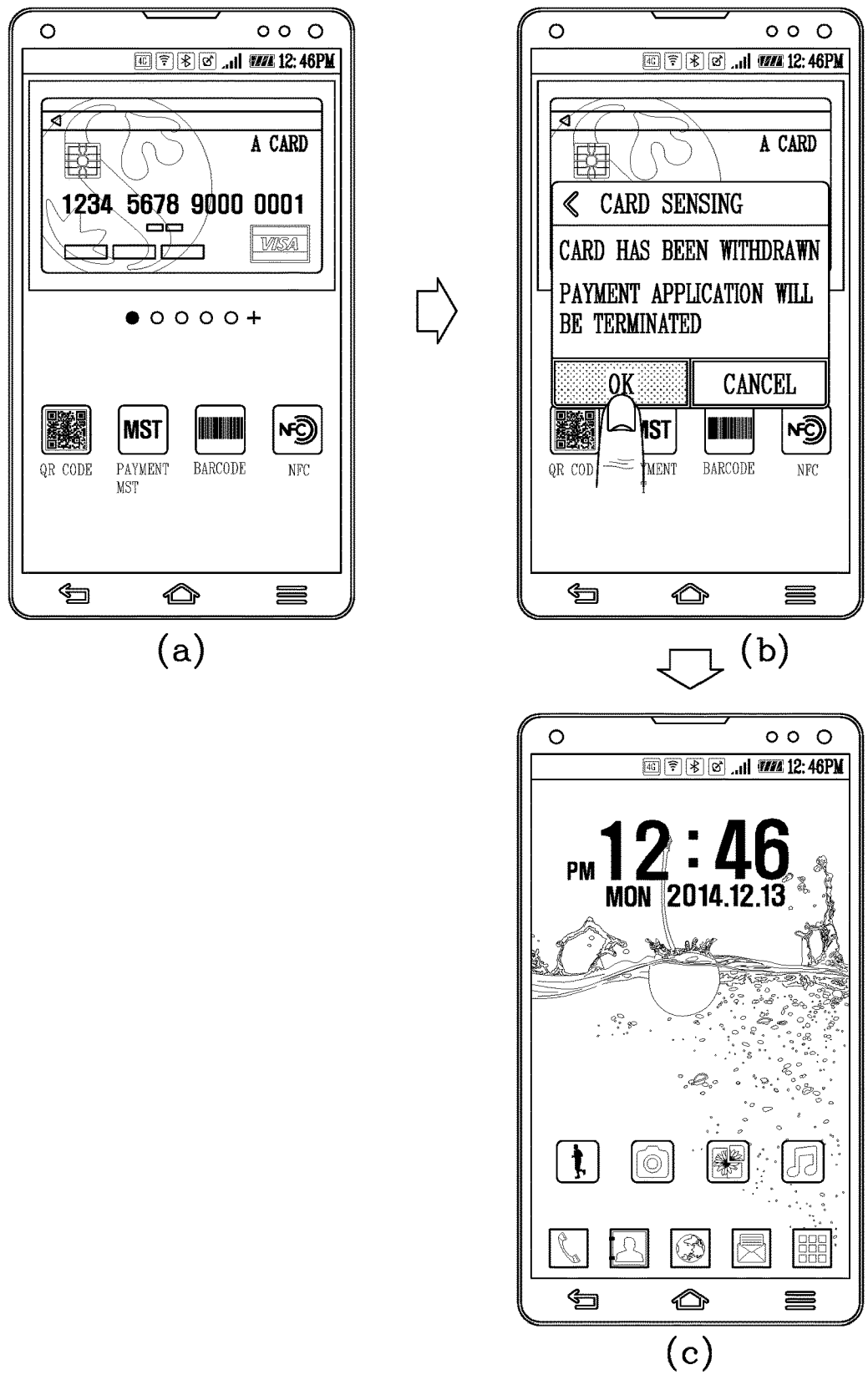
FIG. 10 is a conceptual view illustrating a control method when a withdrawn state of a card is sensed in a mobile terminal according to an embodiment of the present invention.

Hereinafter, a control method when a withdrawn state of the card having been inserted into the back cover is sensed will be explained. In particular, FIG. 10 is a conceptual view illustrating a control method when a withdrawn state of the card is sensed in the mobile terminal according to an embodiment of the present invention.

The controller 180 can sense a withdrawn state of the card through the sensing terminals 360a, 360b, 370a, 370b, in a state where the card has been inserted into the back cover. More specifically, the controller 180 can sense an electrically-disconnected state between the sensing terminals 360a, 370a, as the sensing button 350 is not pressed any longer. That is, the controller 180 can sense that a voltage level of the sensing terminal 360a is not "0".

In this instance, the controller 180 can determine that the card 200 has been withdrawn from the back cover 103. Upon sensing the withdrawn state of the card 200, the controller 180 can output notification information such that a user can recognize the withdrawn state of the card 200. For instance, as shown in FIGS. 10(a) and 10(b), a pop-up window indicating the withdrawn state of the card can be output to the display unit 151.

In addition, the controller 180 can terminate the payment application when the card 200 is withdrawn from the back cover. For instance, as shown in FIGS. 10(b) and 10(c), the controller 180 can terminate the payment application automatically or according to a user's request.

The controller 180 can release a communication connection state with the card 200. In addition, the controller 180 can interrupt power supply to the card 200. That is, the controller 180 can automatically terminate unnecessary functions when the card 200 is withdrawn from the back cover. Accordingly, in the present invention, power consumption required when unnecessary functions are performed can be reduced, and thus battery consumption of the mobile terminal can be reduced.

Upon sensing a withdrawn state of the card 200, the controller 180 can transmit a withdrawal signal to the card 200 through communication. As a result, the card 200 can be converted from the insertion mode to the general mode as shown in FIG. 7.

So far, the operation of the mobile terminal and the card when the card is withdrawn from the back cover has been explained. In the present invention, when a payment is executed by coupling the card and the mobile terminal with each other, a payment function may be performed more conveniently.

Figure 11:
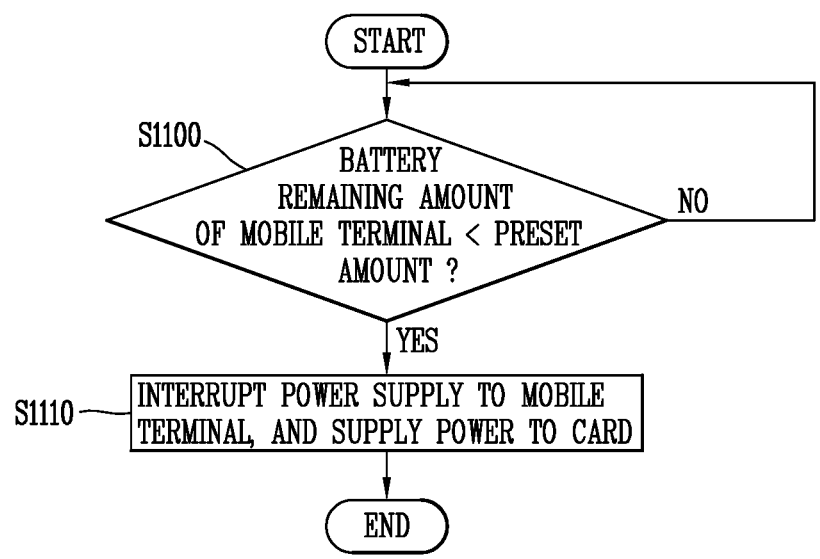
FIG. 11 is a flowchart illustrating an example to supply power to a card by a mobile terminal according to an embodiment of the present invention.

Hereinafter, an operation to supply power to the card in the mobile terminal according to an embodiment of the present invention will be explained. In particular, FIG. 11 is a flowchart illustrating an example to supply power to the card by the mobile terminal according to an embodiment of the present invention.

The controller 180 can supply power to the card 200 when the card 200 is inserted into the back cover 103. With such a configuration, the card 200 can be conveniently supplied with power from the mobile terminal, without being charged additionally.

The controller 180 can supply power to the card 200 in a different manner, according to the amount of the battery remaining. More specifically, referring to FIG. 11, the controller 180 can determine whether a battery remaining amount is smaller than a preset amount (S1100).

Here, the preset amount means an amount preset to the memory 170, and can be set by a user or a manufacturing company of the mobile terminal. When the battery remaining amount is larger than the preset amount (No in S1100), the controller 180 can control the battery to supply power to both of the mobile terminal and the card.

On the contrary, when the battery remaining amount is smaller than the preset amount (Yes in S1100), the controller 180 can supply power to the card while cutting off power supply to the mobile terminal (S1110). That is, if the battery remaining amount is smaller than the preset amount, the controller 180 can interrupt power supply to the mobile terminal, for continuous usage of the card. In this instance, the mobile terminal is turned off.

The controller 180 supplies power only to the card when the battery remaining amount is smaller than the preset amount, thereby ensuring continuous usage of the card. That is, in the present invention, if it is determined that a battery remaining amount is too small to be used for driving of the mobile terminal, power is supplied up to the card. This enhances power efficiency.

In this instance, even if the mobile terminal is in an 'off' state, a user can execute a contact-type payment using the card. The controller 180 can determine whether to supply power to the card 200 or not, according to a power level of the card 200.

For instance, the controller 180 can supply power to the card 200 when a power level of the card 200 is lower than a preset level. On the contrary, the controller 180 can not supply power to the card 200 when the power level of the card 200 is higher than the preset level.

So far, a method to supply power to the card having been inserted into the back cover has been explained. With such a configuration, the card of the present invention may be used by being charged without an additional charging cradle.

Hereinafter, various structures to couple the back cover and the card with each other will be explained. The aforementioned control method may be applicable to all of the following various structures. In particular, FIGS. 12A and 12B are views illustrating a structure to insert the card to the inside of the back cover, from the outside of the back cover.

Figure 12A:
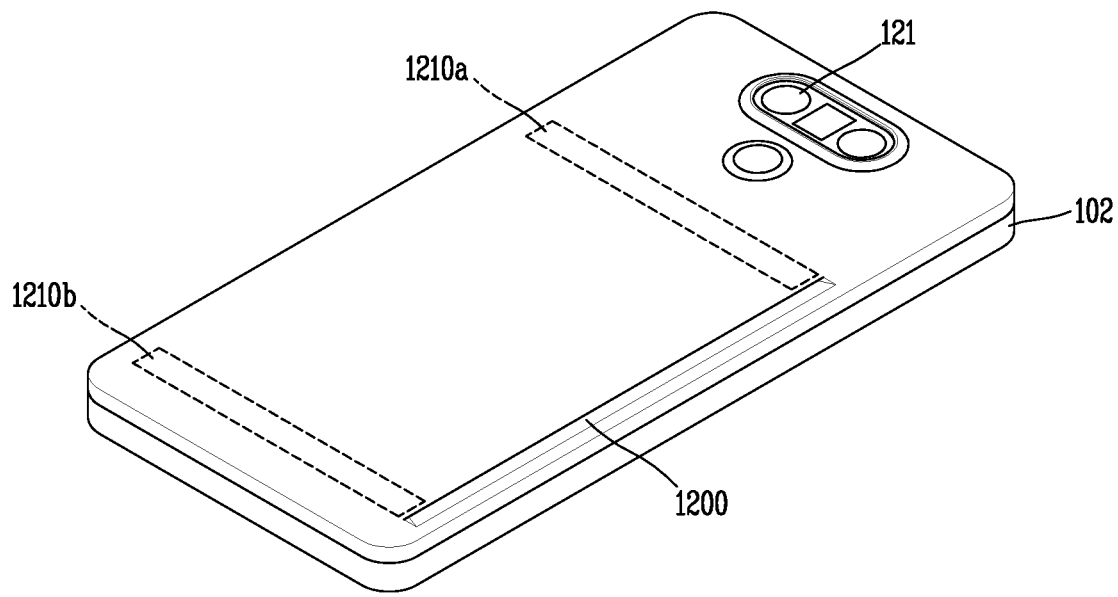
FIGS. 12A and 12B are views illustrating a structure to insert a card to the inside of a back cover, from the outside of the back cover.

Referring to FIG. 12A, a slit 1200, through which the card is inserted to an inner surface of the back cover 103, can be formed on an outer surface of the back cover 103. The slit 1200 can be formed to have a length equal to or longer than a card length, such that the card can be inserted to the inner surface of the back cover 103 in a lengthwise direction.

A pair of guide rails 1210a, 1210b configured to guide sliding of the card may be disposed on the inner surface of the back cover 103, in a vertical manner to the slit 1200. The pair of guide rails 1210a, 1210b can be spaced apart from each other by a length of the card. The pair of guide rails 1210a, 1210b can be the same as those in FIG. 3.

Figure 12B:
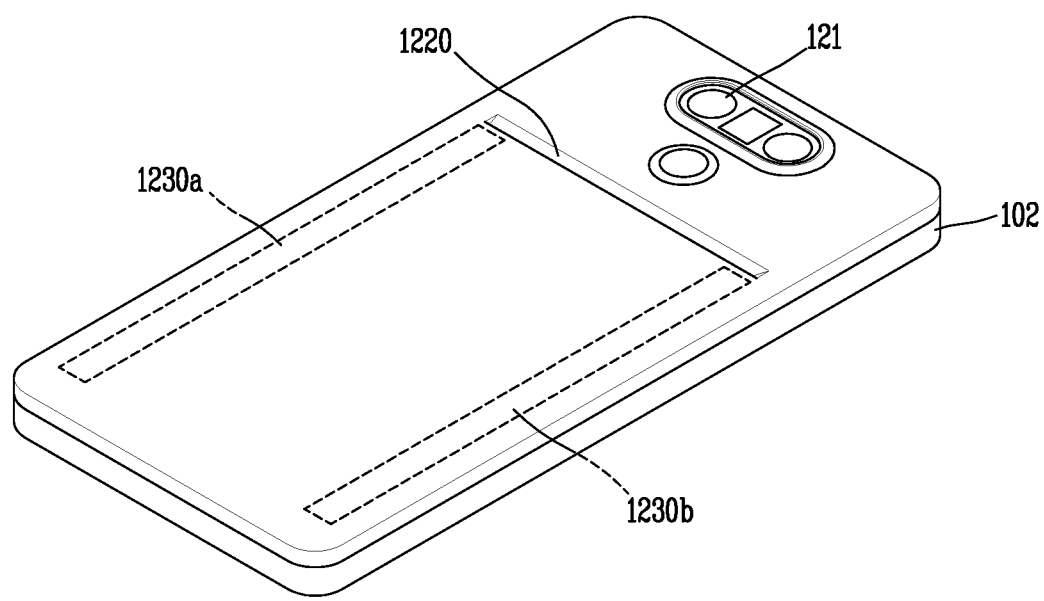

Referring to FIG. 12B, a slit 1220 can be formed on an outer surface of the back cover 103. The slit 1220 can be formed to have a size equal to or larger than a card width, such that the card can be inserted to the inner surface of the back cover 103 in a widthwise direction.

A pair of guide rails 1230a, 1230b configured to guide sliding of the card can be disposed on the inner surface of the back cover 103, in a vertical manner to the slit 1220. The pair of guide rails 1230a, 1230b can be spaced apart from each other by a width of the card. The pair of guide rails 1230a, 1230b can be the same as those in FIG. 3.

Figure 13:
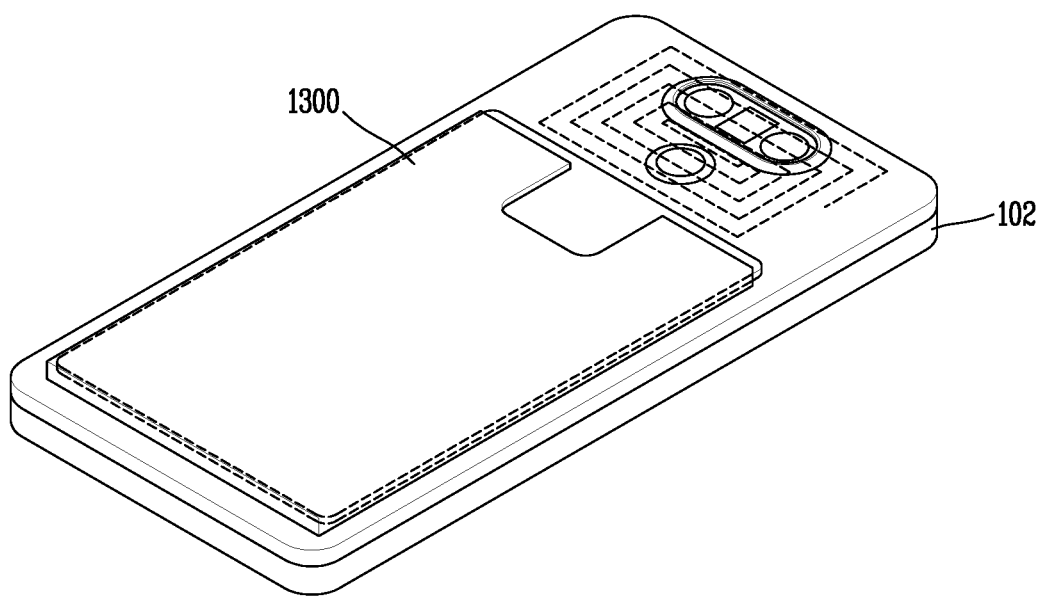
FIG. 13 is a conceptual view illustrating a structure to insert a card to an accommodation space formed outside a back cover.

Next, FIG. 13 is a conceptual view illustrating a structure to insert the card to an accommodation space formed outside the back cover. Referring to FIG. 13, an accommodation region 1300 configured to accommodate the card therein can be provided on an outer surface of the back cover.

The accommodation region 1300 can be formed such that the card can be inserted thereinto or withdrawn therefrom, by an external force. The accommodation region 1300 can have an opening region at a part thereof, such that part of the card accommodated in the accommodation region 1300 can be exposed to the outside through the opening region. In this instance, a user can withdraw the card from the accommodation region 1300, by applying an external force to the card through the opening region.

The accommodation region 1300 can be formed to overlap part of the external surface of the back cover. In this instance, the coil 320 of the back cover 103 can be disposed at a region not overlapped with the accommodation region 1300, as shown in FIG. 13. With such a configuration, interference of a magnetic signal emitted from the coil with that emitted from the card can be prevented.

Figure 14A:
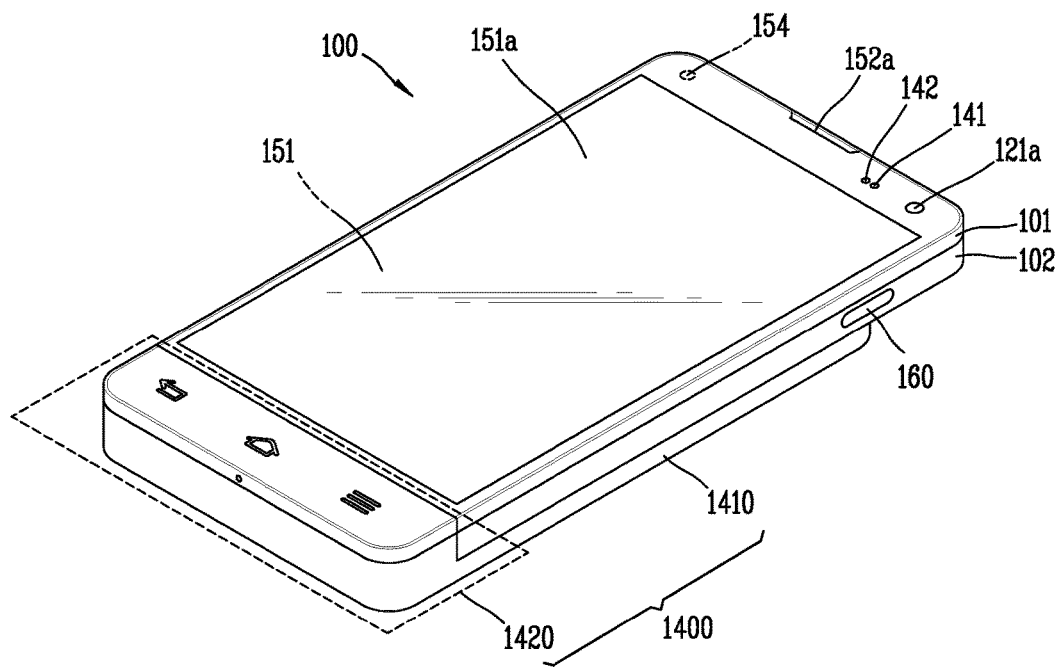
FIGS. 14A to 14C are conceptual views illustrating an example of a card module formed to be detachably mounted to a mobile terminal according to an embodiment of the present invention.
Figure 14B:
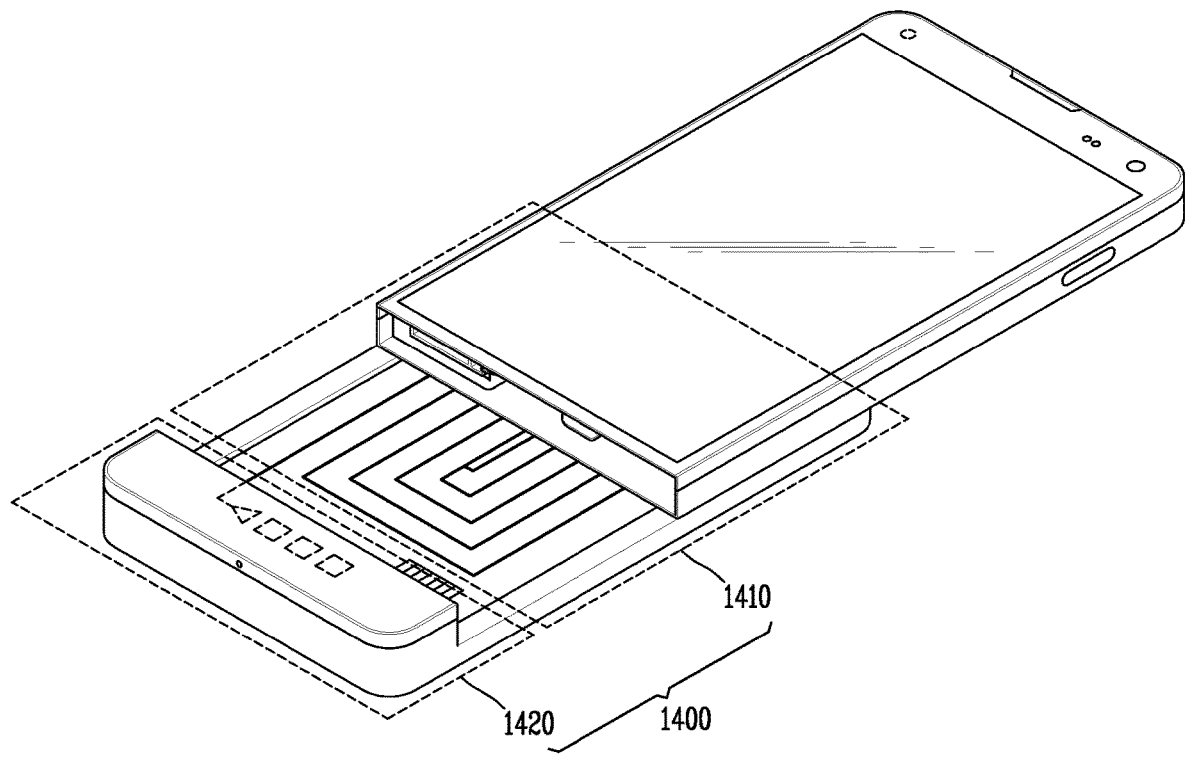
Figure 14C:
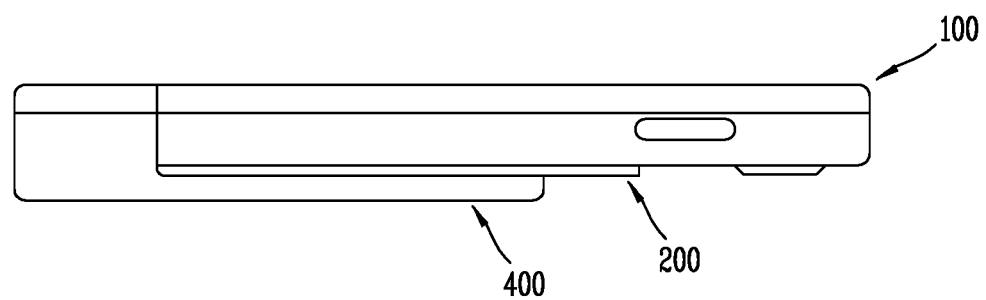
Figure 15A:
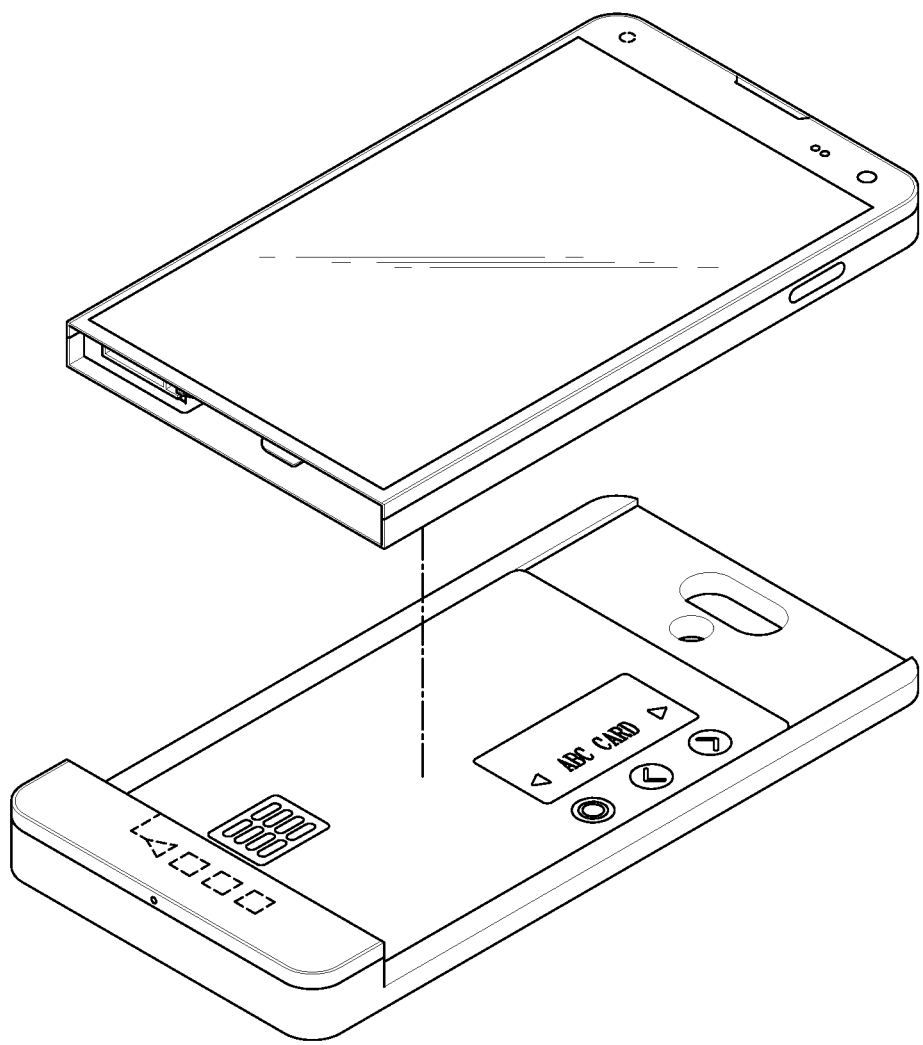
FIGS. 15A and 15B are conceptual views illustrating another example of the card module formed to be detachably mounted to a mobile terminal according to an embodiment of the present invention.
Figure 15B:
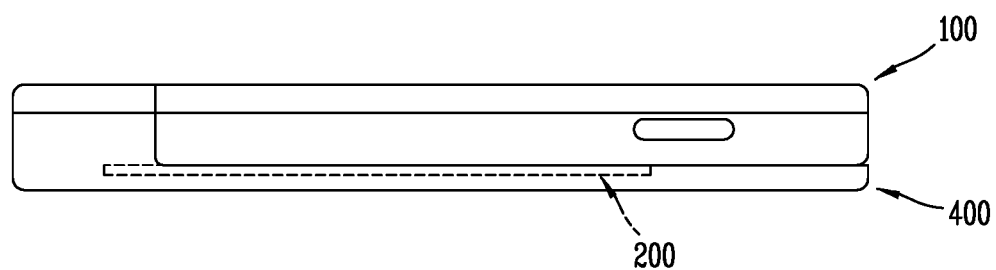

FIGS. 14A to 14C are conceptual views illustrating an example of a card module formed to be detachably mounted to the mobile terminal according to an embodiment of the present invention. And FIGS. 15A and 15B are conceptual views illustrating another example of a card module formed to be detachably mounted to the mobile terminal according to an embodiment of the present invention.

Referring to FIG. 14A, the card module 300 includes an accommodation unit 1400 and a sliding unit 1410. The accommodation unit 1400 can be formed to overlap at least part of a rear surface of the body. The accommodation unit 1400 has the coil 320 therein, and can be configured to accommodate the card therein. That is, the accommodation unit 1400 can mount the card therein.

The accommodation unit 1400 can further include data terminals and a power terminal formed to contact the data terminals and the power terminals of the card, respectively when the card is accommodated in the accommodation unit 1400. The accommodation unit 1400 can be formed to have a length equal to or longer than a card length. Alternatively, the accommodation unit 1400 can be formed to have a length shorter than that of the mobile terminal.

The sliding unit 1410 can be formed to extend from one end of the accommodation unit 1400, and to be detachably mounted to one end of the body 100. Referring to FIGS. 14A and 14B, the sliding unit 1410 can be connected to a lower end of the mobile terminal or can be separated therefrom, by an external force. As the sliding unit 1410 is connected to or separated from the mobile terminal, the card can be connected to or separated from the mobile terminal.

The sliding unit 1410 can include connection terminals connected to a circuit board of the body. The connection terminals can supply power supplied from the power supply unit of the body to the card, or can serve as a data connection passage between the card and the body.

The sliding unit 1410 can be connected to the body of the mobile terminal, and can form one end of the mobile terminal. Here, the card accommodated in the accommodation unit 1400 can be disposed inside or outside the body as the sliding unit 1410 is coupled to the mobile terminal.

For instance, as shown in FIG. 14C, the card can be disposed outside the body. Referring to FIG. 14C, the card 200 accommodated in the accommodation unit 1400 can be disposed outside the back cover 103 as the sliding unit 1410 is coupled to the mobile terminal. That is, the card 200 can be exposed to the outside of the mobile terminal.

On the contrary, the card can be disposed in the body of the mobile terminal. As shown in FIG. 15A, the accommodation unit 1400 can have the same size as a length of the mobile terminal. In this instance, the accommodation unit 1400 can be formed to cover the rear case 102, rather than the back cover 103 of the mobile terminal.

When the accommodation unit 1400 is coupled to the mobile terminal by the sliding unit 1410, the card can be disposed between the accommodation unit 1400 and the rear case 102 of the mobile terminal. Accordingly, the card 200 accommodated in the accommodation unit 1400 can be positioned in the mobile terminal, without being exposed to the outside. With such a configuration, as shown in FIG. 15C, the card 200 can be inserted into or withdrawn from the body as the sliding unit 1410 is coupled to the mobile terminal.

Hereinafter, another embodiment of the mobile terminal and the card which provide a payment service according to an embodiment of the present invention will be explained. In particular, FIGS. 16A and 16B are conceptual views illustrating another embodiment of the card according to an embodiment of the present invention, and FIG. 17 is a conceptual view illustrating a structure of the back cover coupled to the card shown in FIGS. 16A and 16B.

Figure 16A:
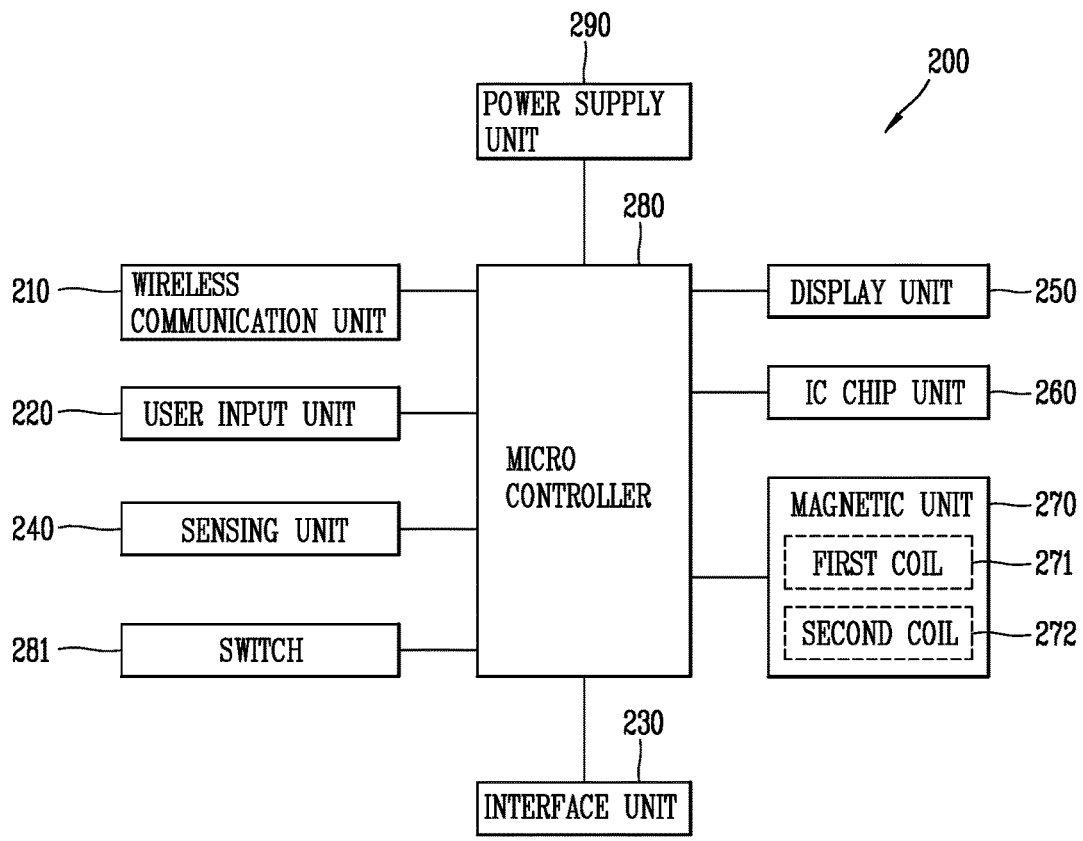
FIGS. 16A and 16B are conceptual views illustrating another embodiment of a card according to an embodiment of the present invention.
Figure 16B:
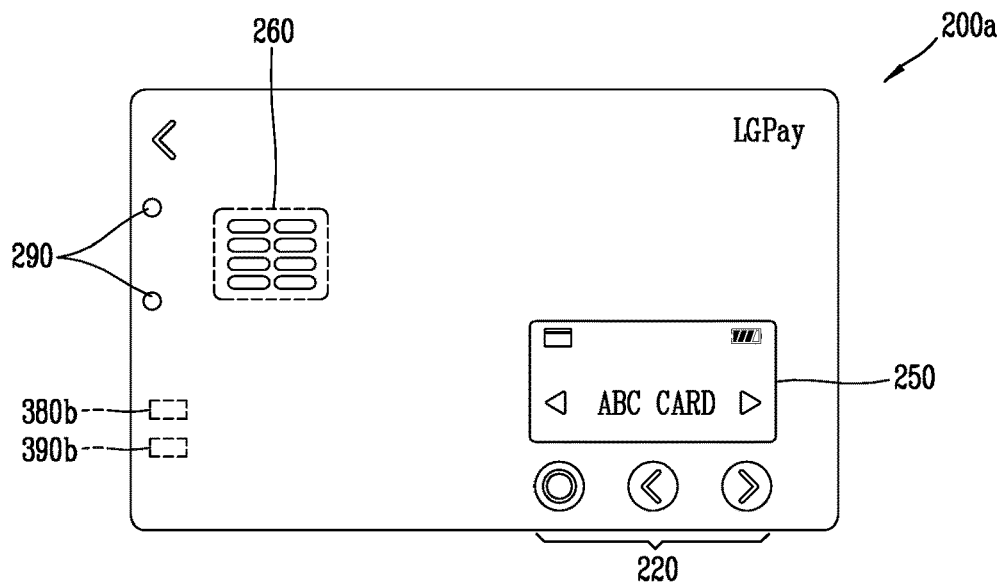
Figure 17:
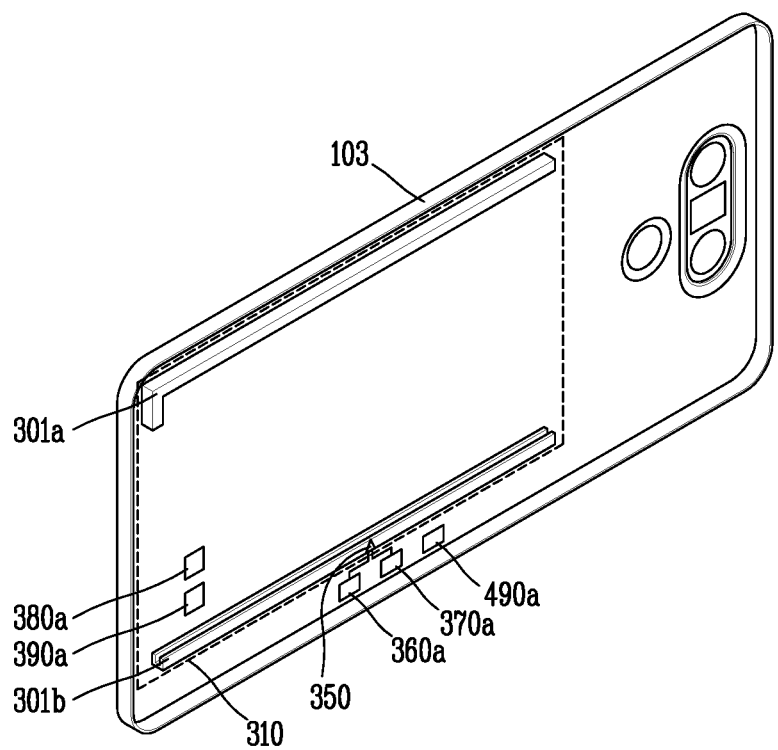
FIG. 17 is a conceptual view illustrating a structure of a back cover coupled to the card shown in FIGS. 16A and 16B.

As shown in FIG. 16A, the card 200 according to another embodiment of the present invention can include a first coil 271 and a second coil 272 which perform different functions, the coils provided at the magnetic unit 270. Hereinafter, only a function of the magnetic unit 270 of FIG. 16A, differentiated from those of the magnetic unit 270 of FIG. 2A will be explained.

The card 200 according to another embodiment of the present invention can be provided with the first coil 271 and the second coil 272 at the magnetic unit 270, thereby sending a magnetic stripe signal using one of the two coils according to an operation mode of the card 200.

The first coil 271 means a coil which sends a magnetic stripe signal without communication with the mobile terminal when the card contacts a payment machine. That is, a user can execute a contact type payment using a magnetic stripe signal emitted from the first coil 271.

The second coil 272 means a coil which sends a magnetic stripe signal through communication with the mobile terminal, near a payment machine. That is, a user can execute a non-contact type payment using a magnetic stripe signal emitted from the second coil 272.

The switch 281 executes a switching operation such that card information can be transferred to one of the first coil 271 and the second coil 272. The operation of the switch 281 will be explained. Firstly, once a payment request is received from the mobile terminal, the micro controller 280 can sense that the card 200 has been inserted into the back cover 103. In this instance, the micro controller 280 can control the switch 281 such that card information can be transferred to the second coil 272.

Once a withdrawal signal is received from the mobile terminal, the micro controller 280 can control the switch 281 such that card information can be transferred to the first coil 271. That is, the control method of the card 200 can be executed in a similar manner to that of FIG. 7.

When both of the first coil 271 and the second coil 272 are provided on the card 200, the card 200 can not be provided with the data terminal 330b (refer to FIG. 2B), because the card 200 needs not transfer card information to the back cover 103 any longer. That is, the interface unit 230 of the card 200 can not include the data terminal 330b connected to the back cover 103.

Accordingly, as shown in FIG. 16B, the rear surface of the card 200 can be provided with only the ground terminal 380b and the power terminal, without the data terminal 330b. Likewise, referring to FIG. 17, the data cover 103 coupled to the card 200 can not include the data terminal 330a electrically connected to the data terminal 330b of the card 200.

As shown in FIG. 17, the back cover 103 may not include thereon a coil or a booster configured to amplify a current. That is, the back cover 103 can merely serve to mount the card therein, and to transmit power of the mobile terminal to the card.

It is obvious to those skilled in the art that the aforementioned control methods are also applicable to the structure of the card 200 and the back cover 103, and thus detailed explanations thereof are omitted.

The mobile terminal according to an embodiment of the present invention has the following advantages. Firstly, since the back cover of the mobile terminal has a structure to couple the card thereto, a non-contact type payment can be executed based on card information of the card which can execute only a contact type payment.

Further, once the card is inserted into the back cover of the mobile terminal, a payment function using the card is automatically executed. This allows a payment service to be provided without a user's additional action. In addition, as power is supplied to the card coupled to the mobile terminal, power of the mobile terminal can be provided to the card when the card has an insufficient power.

Further, as the card and the mobile terminal are coupled to each other, a user can execute a contact type payment or a non-contact type payment according to a situation. In addition, as various structures to couple the mobile terminal and the card with each other are proposed, various types of mobile terminals can be provided.

Further, the card of the present invention is provided with the magnetic coil thereon. This allows the card to execute both a contact type payment and a non-contact type payment, without transceiving (transmitting and receiving) data with the mobile terminal.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication unit configured to provide wireless communication;
a display; and
a back cover mounted to a rear surface of a body of the mobile terminal,
wherein the back cover includes:
an accommodation unit formed on one surface of the back cover, and configured to accommodate a smart card inserted into the accommodation unit;
a coil configured to convert a current signal from a data terminal of the smart card into a magnetic signal to transmit the magnetic signal to a payment machine around the mobile terminal; and
a data terminal electrically connected to the coil, disposed at a position contacting the data terminal of the smart card inserted into the accommodation unit and configured to transfer the current signal from the smart card to the coil.

2. The mobile terminal of claim 1, wherein the accommodation unit accommodates the smart card therein such that the coil is disposed at a position farther from the body than the smart card inserted into the accommodation unit.

3. The mobile terminal of claim 1, wherein the back cover further includes a first sensing unit configured to sense whether or not the smart card has been inserted into the accommodation unit, and
wherein the body includes a second sensing unit disposed to face the first sensing unit such that a sensing signal from the first sensing unit is transferred thereto.

4. The mobile terminal of claim 3, further comprising:
a controller configured to execute a payment application installed on the mobile terminal, and display notification information indicating the inserted state of the smart card on the display, when the sensing signal indicates an inserted state of the smart card into the accommodation unit is input through the second sensing unit.

5. The mobile terminal of claim 4, wherein when the payment application is executed, the controller is further configured to display at least one card information stored in the smart card on the display.

6. The mobile terminal of claim 4, wherein when the sensing signal indicating the inserted state of the smart card into the accommodation unit is input through the second sensing unit, the controller is further configured to transmit a payment request to the smart card, such that the smart card operates in an insertion mode.

7. The mobile terminal of claim 6, wherein the smart card includes:
a first path set for a contact type payment;
a second path set for a non-contact type payment;
a switch configured to switch between the first path and the second; and
a micro controller configured to control the switch such that card information is transferred along the second path, in response to the payment request from the mobile terminal.

8. The mobile terminal of claim 7, wherein in response to the smart card being withdrawn from the accommodation unit, the controller is further configured to transmit a withdrawal signal to the smart card such that a payment path is changed to the first path from the second path.

9. The mobile terminal of claim 1, further comprising:
a controller configured to activate the wireless communication unit for communication with the smart card when the smart card is inserted into the accommodation unit.

10. The mobile terminal of claim 9, wherein the controller is further configured to transmit a payment command to the smart card through the wireless communication unit.

11. The mobile terminal of claim 1, wherein when the smart card is inserted into the accommodation unit, the controller is further configured to detect a battery voltage level of the smart card in order to check a contact state of the smart card.

12. The mobile terminal of claim 1, wherein the back cover further includes a booster electrically connected to the coil, and configured to transmit card information received from the data terminal to the coil, after converting the card information into the current signal and then amplifying the current signal.

13. The mobile terminal of claim 12, wherein the coil is further configured to:
convert the current signal amplified by the booster into the magnetic signal, and
transmit the magnetic signal to the payment machine.

14. The mobile terminal of claim 1, further comprising:
a power supply unit configured to supply power to the body; and
a controller,
wherein the back cover further includes:
a contact terminal formed to receive power from the power supply unit; and
a power terminal formed to transfer power received from the body to the smart card, and
wherein the controller is further configured to supply power to the contact terminal through the power supply unit, such that the power is supplied to the smart card inserted into the accommodation unit.

15. The mobile terminal of claim 14, wherein the smart card transfers card information to the data terminal using the power supplied through the power terminal.

* * * * *